(12) United States Patent
Xue et al.

(10) Patent No.: US 11,576,211 B2
(45) Date of Patent: Feb. 7, 2023

(54) AUTONOMOUS SIDELINK OVER UNLICENSED BAND

(71) Applicant: QUALCOMM INCORPORATED, San Diego, CA (US)

(72) Inventors: Yisheng Xue, San Diego, CA (US); Chih-Hao Liu, San Diego, CA (US); Xiaoxia Zhang, San Diego, CA (US); Jing Sun, San Diego, CA (US); Yongbin Wei, La Jolla, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 17/090,393

(22) Filed: Nov. 5, 2020

(65) Prior Publication Data

US 2021/0195649 A1    Jun. 24, 2021

Related U.S. Application Data

(60) Provisional application No. 62/950,436, filed on Dec. 19, 2019.

(51) Int. Cl.
| | |
|---|---|
| H04W 74/08 | (2009.01) |
| H04W 72/04 | (2009.01) |
| H04W 92/18 | (2009.01) |
| H04W 16/14 | (2009.01) |

(52) U.S. Cl.
CPC ............... *H04W 74/0833* (2013.01); *H04W 72/0406* (2013.01); *H04W 16/14* (2013.01); *H04W 72/0453* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 2017/0325216 A1* | 11/2017 | Nogami | ............... | H04L 1/1896 |
| 2018/0220455 A1* | 8/2018 | Baghel | ............... | H04L 5/003 |
| 2019/0110325 A1* | 4/2019 | Gulati | ............... | H04L 5/0032 |

(Continued)

FOREIGN PATENT DOCUMENTS

WO    WO-2018106841 A1 *  6/2018  ............ H04L 5/0048

OTHER PUBLICATIONS

InterDigital Inc. "Mode 2a and Mode 2d for NR V2X Resource Allocation", Document No. R1-1900769, submitted as prior art by the applicant, Jan. 2019 (Year: 2019).*

(Continued)

*Primary Examiner* — Jamaal Henson
(74) *Attorney, Agent, or Firm* — Haynes and Boone, LLP

(57) ABSTRACT

Wireless communications systems and methods related to autonomous sidelink communication in a radio frequency band (e.g., in a shared spectrum or an unlicensed spectrum) shared by multiple network operating entities are provided. A first user equipment (UE) performs a listen-before-talk (LBT) in a shared radio frequency band based on a first starting point of a plurality of starting points within an LBT gap duration. The first UE transmits, to a second UE, a first sidelink communication in the shared radio frequency band based on the LBT, the first sidelink communication including first sidelink control information (SCI) and first sidelink data.

40 Claims, 11 Drawing Sheets

(56) References Cited

U.S. PATENT DOCUMENTS

2019/0200386 A1* 6/2019 Yang ................. H04W 74/0875
2020/0052803 A1* 2/2020 Deenoo ............... H04B 17/318
2020/0146061 A1* 5/2020 Bharadwaj ............. H04W 4/40

OTHER PUBLICATIONS

Huawei, et al., "Sidelink Resource Allocation Mode 2 for NR V2X", 3GPP Draft, R1-1911884, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823066, 14 Pages, Retrieved from the Internet: URL:https://ftp.3gpp.org/tsg_ran/WG1_RL1/TSGR1_99/Docs/R1-1911884.zip R1-1911884.docx [retrieved on Nov. 9, 2019] the Whole Document.

International Search Report and Written Opinion—PCT/US2020/059553—ISA/EPO—dated Jan. 26, 2021.
Fraunhofer HHI., et al., "Resource Allocation for Mode 2 NR V2X", 3GPP Draft, 3GPP TSG RAN WG1 #98bis, R1-1910556_MODE2RA, 3rd Generation Partnership-Project (3GPP), Mobile Competence Centre, 650, Route Lucioles, F-06921 Sophia-Antipolis Cedex, France, vol, RAN WG1, No. Chongqing, China, Oct. 14, 2019-Oct. 2, 2019, Oct. 7, 2019 (Oct. 7, 2019), XP051808945, 8 Pages, the Whole Document.
Intel Corporation: "Summary of Contributions and Initial Outcome of Offline Discussion for NR-V2X AI-7.2.4.1.4 Resource Allocation Mechanism", 3GPP TSG RAN WG1 Ad Hoc Meeting #1901, R1-1901375—INTEL—NR V2X AI7.2.4.1.4—RAM—Tuesday Offline, 3rd Generation Partnership Project, Mobile Competence Centre, 650, Route Des Lucioles, F-06921 Sophia-Antipolis Ce vol. Ran WG1, No. Taipei, Jan. 21, 2019-Jan. 25, 2019, Jan. 22, 2019, XP051601303, 17 Pages, pp. 2-5, 2.1 Mode-2(a) pp. 5-6, 2.2 Mode-2(c) pp. 7-11, 2.3 Mode-2(d).

* cited by examiner

AUTONOMOUS SIDELINK OVER UNLICENSED BAND

CROSS REFERENCE TO RELATED APPLICATIONS

The present application claims priority to and the benefit of U.S. Provisional Patent Application No. 62/950,436, filed Dec. 19, 2019, which is hereby incorporated by reference in its entirety as if fully set forth below and for all applicable purposes.

TECHNICAL FIELD

This application relates to wireless communication systems, and more particularly to autonomous sidelink communication in a radio frequency band (e.g., in a shared spectrum or an unlicensed spectrum) shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications for D2D, V2X, and/or C-V2X over a dedicated spectrum, a licensed spectrum, and/or an unlicensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes performing, by a first user equipment (UE), a listen-before-talk (LBT) in a shared radio frequency band based on a first starting point of a plurality of starting points within an LBT gap duration; and transmitting, by the first UE to a second UE, a first sidelink communication in the shared radio frequency band based on the LBT, the first sidelink communication including first sidelink control information (SCI) and first sidelink data.

In an additional aspect of the disclosure, an apparatus includes a processor configured to perform a listen-before-talk (LBT) in a shared radio frequency band based on a first starting point of a plurality of starting points within an LBT gap duration; and a transceiver configured to transmit, to a second user equipment (UE), a first sidelink communication in the shared radio frequency band based on the LBT, the first sidelink communication including first sidelink control information (SCI) and first sidelink data.

In an additional aspect of the disclosure, a non-transitory computer-readable medium having program code recorded thereon, the program code includes code for causing a first user equipment (UE) to perform a listen-before-talk (LBT) in a shared radio frequency band based on a first starting point of a plurality of starting points within an LBT gap duration; and code for causing the first UE to transmit, to a second UE, a first sidelink communication in the shared radio frequency band based on the LBT, the first sidelink communication including first sidelink control information (SCI) and first sidelink data.

In an additional aspect of the disclosure, an apparatus includes means for performing a listen-before-talk (LBT) in a shared radio frequency band based on a first starting point of a plurality of starting points within an LBT gap duration; and means for transmitting, to a second UE, a first sidelink communication in the shared radio frequency band based on the LBT, the first sidelink communication including first sidelink control information (SCI) and first sidelink data.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
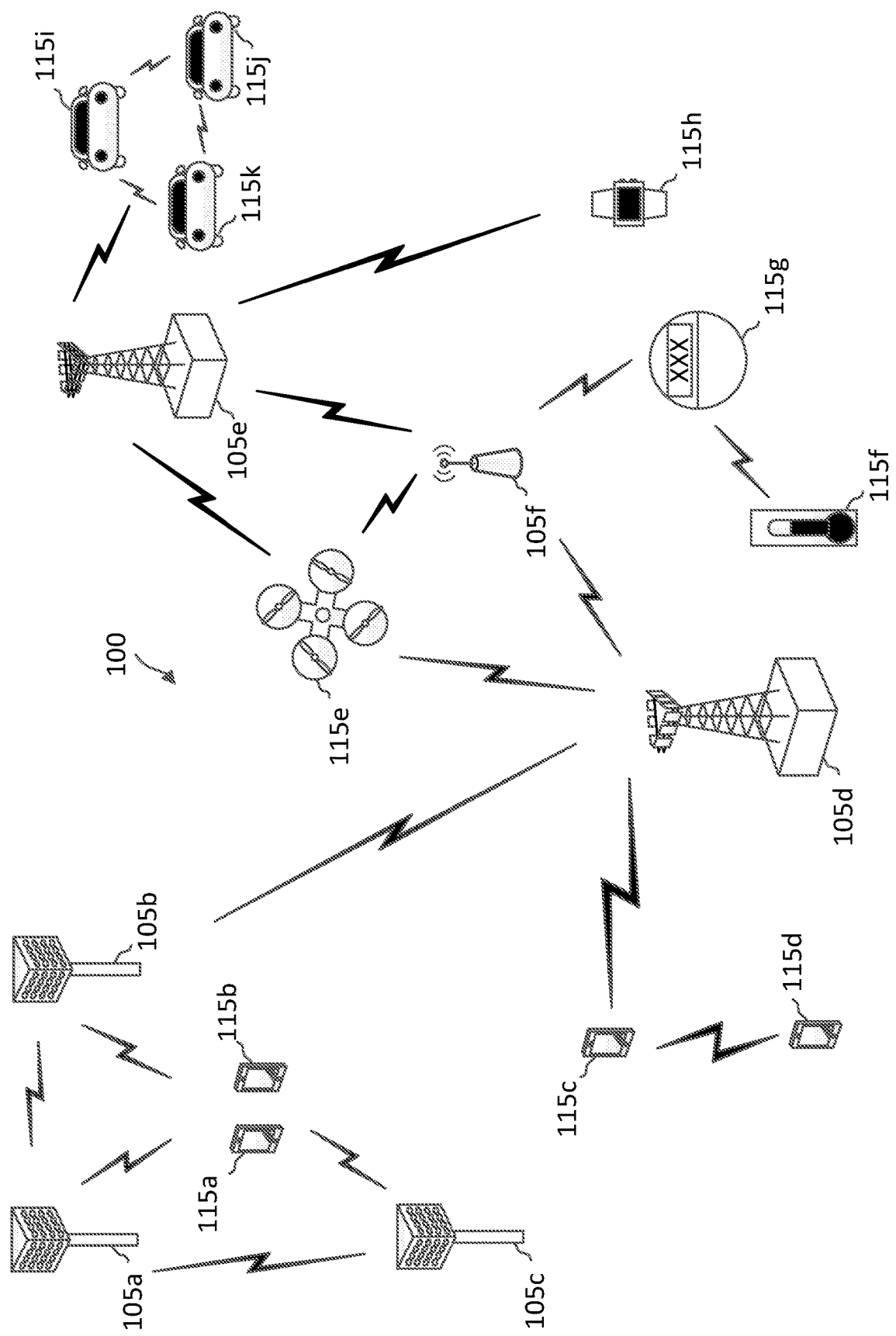
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspect, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include vehicle-to-everything (V2X), industrial IoT (IIoT), and/or NR-lite.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS may determine a radio resource on behalf of a sidelink UE and transmit an indication of the radio resource to the sidelink UE. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication. Sidelink communications that use mode-2 RRA may be referred to as autonomous sidelink communications.

The deployment of NR over an unlicensed spectrum is referred to as NR-unlicensed (NR-U). Some studies have been conducted for NR-U deployment over 5 gigahertz (GHz) unlicensed bands. Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink canbenefit from utilizing the additional bandwidth available in unlicensed spectrum.

The present application describes mechanisms for sidelink UEs to perform autonomous sidelink communications over a shared radio frequency band (e.g., in a shared radio spectrum or an unlicensed spectrum) and to coexist with other technologies (e.g., WiFi, LAA). In some aspects, a sidelink system may utilize SCI monitoring or sensing to handle intra-technology or intra-system collisions (among sidelink UEs of the same system) and may utilize listen-before-talk (LBT) to handle inter-technology collisions for coexistence with other technologies. In some aspects, the shared radio frequency band may be partitioned into multiple subchannels or frequency subbands. A sidelink UE may be configured to operate in a mode-2 RRA. For instance, the sidelink UE may be configured with a resource pool in the shared radio frequency band. The sidelink UE may utilize a wideband receiver for SCI monitoring or sensing in the resource pool and may utilize a narrowband transmitter for frequency subband based channel access. Additionally, the channel access may be in units of sidelink communication frames in time. Each sidelink communication frame may include an LBT gap duration followed by a sidelink resource. A sidelink UE intending to transmit in a frequency subband may perform an LBT in the LBT gap duration. If the LBT is pass, the sidelink UE may proceed to transmit SCI and/or sidelink data in the following sidelink resource. In some aspects, the sidelink system may be a synchronous system where sidelink UEs are synchronized in time, for example, based on synchronization signal blocks (SSBs) received from a base station (BS) or a sidelink UE.

In some aspects, an LBT gap duration may include a plurality of LBT starting points to provide prioritized channel access. An LBT starting point refers to the time when a sidelink UE may start to perform an LBT. The LBT starting points within an LBT gap duration may have a decreasing channel access or contention priority. For instance, an earlier LBT starting point in an LBT gap duration may provide a higher channel access priority than a later LBT starting point in the LBT gap duration.

In some aspects, a sidelink UE may reserve one or more LBT starting points in an LBT gap duration and may indicate a reservation for the one or more LBT starting points in a PSCCH SCI. For instance, the sidelink UE may transmit SCI in a current sidelink resource to reserve one or more LBT starting points during an LBT gap duration for a later sidelink resource. In some aspects, the SCI may indicate a priority of the reservation. A high-priority sidelink UE (e.g., with high-priority sidelink traffic) may reserve an earlier LBT starting point, whereas a low-priority sidelink UE (e.g., with low-priority sidelink traffic) may reserve a later LBT starting point. In some aspects, a high-priority UE may reserve a greater number of LBT starting points in an LBT gap duration than a low-priority sidelink UE. In some aspects, a high-priority sidelink UE may reserve all LBT starting points in an LBT gap duration. For instance, the high-priority sidelink UE may perform an LBT beginning at the earliest LBT starting point. The high-priority sidelink UE may retry an LBT at each subsequent LBT starting point upon a LBT failure. Upon a LBT success, the UE may transmit in the sidelink resource. In some aspects, the sidelink UE may transmit SCI to reserve different LBT starting points in different frequency subbands during an LBT gap duration.

In some aspects, the sidelink UE may monitor for SCI from another sidelink UE. The sidelink UE may opportunistically override a low-priority LBT starting point reservation by another sidelink UE. In some aspects, the sidelink UE may be configured with a frequency hopping pattern.

Upon passing an LBT and winning a channel occupancy time (COT), the UE may hop from one frequency subband to another frequency subband sidelink transmission within a duration of the COT. In some aspects, the sidelink UE may adjust a channel access occupancy ratio (CR) and/or a channel busy ratio (CBR) based on the frequency hopping pattern and/or LBT results and report the adjusted CBR and/or adjusted CR to a BS.

Aspects of the present disclosure can provide several benefits. For example, the use of LBT prior to a sidelink resource can allow sidelink UEs to coexist with other technologies (e.g., WiFi, LAA). The use of multiple LBT starting points within an LBT gap duration can provide prioritized channel access. Additionally, by allowing a sidelink UE failing an LBT at an early LBT starting point to retry an LBT a later LBT starting point within the same LBT gap duration can reduce waste of radio resource due to LBT failures. The indications of LBT starting point reservations in SCI can reduce intra-system collision among sidelink UEs in the sidelink system. The opportunistic overriding of a low-priority LBT starting point reservation can further provide a high-priority sidelink UE with a greater chance in gaining access to the channel. The use of subband channel access and/or frequency hopping can allow the sidelink system to be compatible with regulations in 2.4 GHz unlicensed bands, and thus may allow for deployment of sidelink systems over 2.4 GHz unlicensed bands. The frequency hopping-based and/or LBT-based adjustment to CBR and/or CR calculations can provide a better or more accurate view to the channel state and/or sidelink UE channel utilizations within the sidelink system, and thus the BS may be able to configure the sidelink UEs, the resource pool, and/or the frequency hopping patterns for the sidelink UEs to reduce intra-system collisions. While the present disclosure is described in the context of deploying autonomous sidelink communication over a 2.4 GHz unlicensed band, the disclosed aspect can be applied to any suitable shared or unlicensed band.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive IHMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OS. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may support sidelink communication among the UEs 115 over a shared radio frequency band (e.g., in a shared spectrum or an unlicensed spectrum). In some aspects, the UEs 115 may communicate with each other over a 2.4 GHz unlicensed band, which may be shared by multiple network operating entities using various radio access technologies (RATs) such as NR-U, WiFi, and/or licensed-assisted access (LAA) as shown in FIG. 2.

Figure 2:
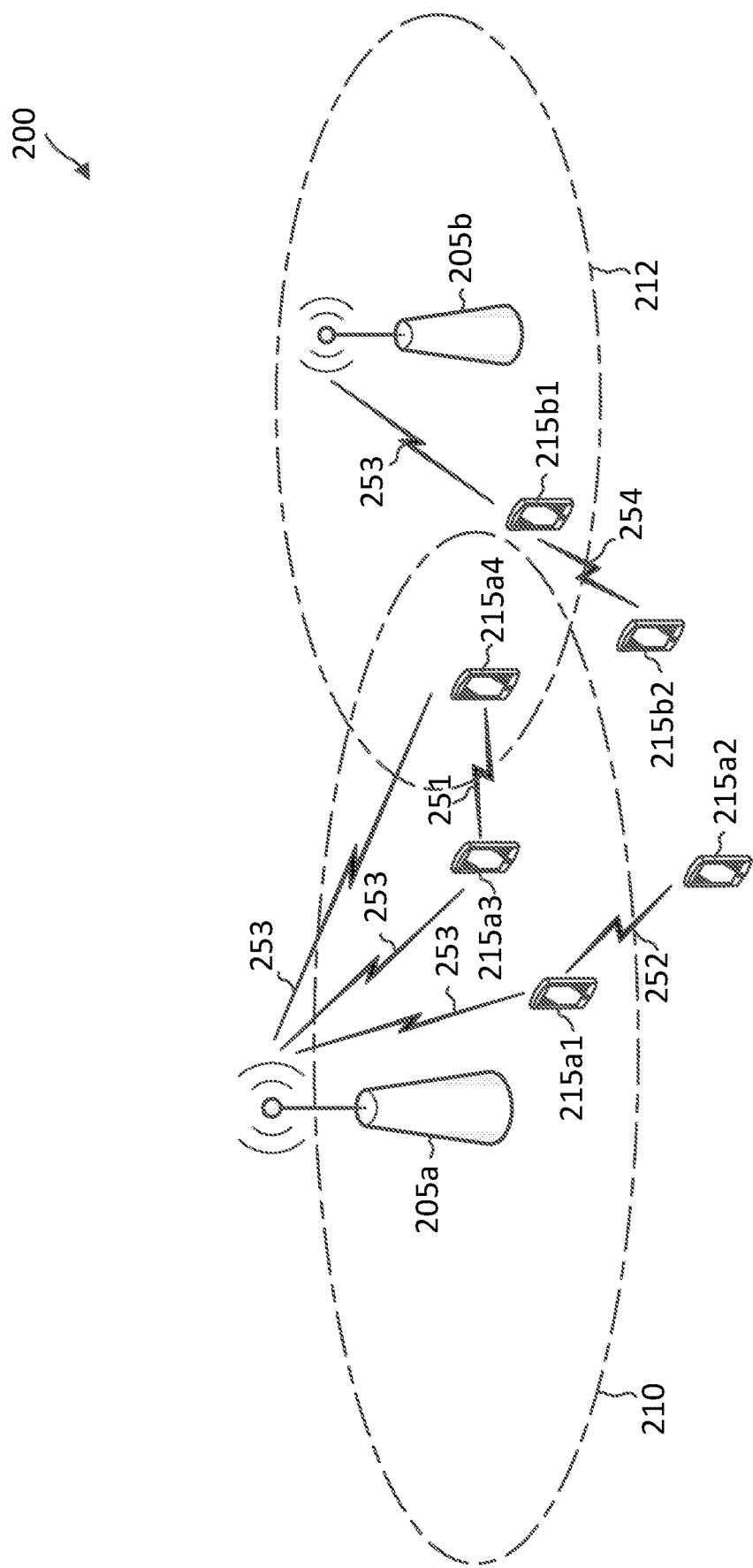
FIG. 2 illustrates a wireless communication network that provisions for sidelink communications according to some aspects of the present disclosure.

FIG. 2 illustrates an example of a wireless communication network 200 that provisions for sidelink communications according to aspect of the present disclosure. The network 200 may correspond to a portion of the network 100. FIG. 2 illustrates two BSs 205 (shown as 205a and 205b) and six UEs 215 (shown as 215a1, 215a2, 215a3, 215a4, 215b1, and 215b2) for purposes of simplicity of discussion, though it will be recognized that aspect of the present disclosure may scale to any suitable number of UEs 215 (e.g., the about 2, 3, 4, 5, 7 or more) and/or BSs 205 (e.g., the about 1, 3 or more). The BS 205 and the UEs 215 may be similar to the BSs 105 and the UEs 115, respectively. The BSs 205 and the UEs 215 may share the same radio frequency band for communications. In some instances, the radio frequency band may be a 2.4 GHz unlicensed band, a 5 GHz unlicensed band, or a 6 GHz unlicensed band. In general, the shared radio frequency band may be at any suitable frequency.

The BS 205a and the UEs 215a1-215a4 may be operated by a first network operating entity. The BS 205b and the UEs 215b1-215b2 may be operated by a second network operating entity. In some aspects, the first network operating entity may utilize a same RAT as the second network operating entity. For instance, the BS 205a and the UEs 215a1-215a4 of the first network operating entity and the BS 205b and the UEs 215b1-215b2 of the second network operating entity are NR-U devices. In some other aspects, the first network operating entity may utilize a different RAT than the second network operating entity. For instance, the BS 205a and the UEs 215a1-215a4 of the first network operating entity may utilize NR-U technology while the BS 205b and the UEs 215b1-215b2 of the second network operating entity may utilize WiFi or LAA technology.

In the network 200, some of the UEs 215a1-215a4 may communicate with each other in peer-to-peer communications. For example, the UE 215a1 may communicate with the UE 215a2 over a sidelink 252, the UE 215a3 may communicate with the UE 215a4 over another sidelink 251, and the UE 215b1 may communicate with the UE 215b2 over yet another sidelink 254. The sidelinks 251, 252, and 254 are unicast bidirectional links. Some of the UEs 215 may also communicate with the BS 205a or the BS 205b in a UL direction and/or a DL direction via communication links 253. For instance, the UE 215a1, 215a3, and 215a4 are within a coverage area 210 of the BS 205a, and thus may be in communication with the BS 205a. The UE 215a2 is outside the coverage area 210, and thus may not be in direct communication with the BS 205a. In some instances, the UE 215a1 may operate as a relay for the UE 215a2 to reach the BS 205a. Similarly, the UE 215b1 is within a coverage area 212 of the BS 205b, and thus may be in communication with the BS 205b and may operate as a relay for the UE 215b2 to reach the BS 205b. In some aspects, some of the UEs 215 are associated with vehicles (e.g., similar to the UEs 115i-k) and the communications over the sidelinks 251, 252, and 254 may be C-V2X communications. C-V2X communications may refer to communications between vehicles and any other wireless communication devices in a cellular network.

As discussed above, NR supports an autonomous RRA in mode-2 for sidelink. In the current NR sidelink framework, sidelink UEs may indicate sidelink resource reservations via SCI and intra-NR sidelink collisions (among NR sidelink UEs) are controlled via SCI sensing. The present disclosure provides techniques for NR-U sidelink UEs configured with a mode-2 RRA to communicate over a shared radio frequency band or an unlicensed band and to coexist with other RATs.

Figure 3:
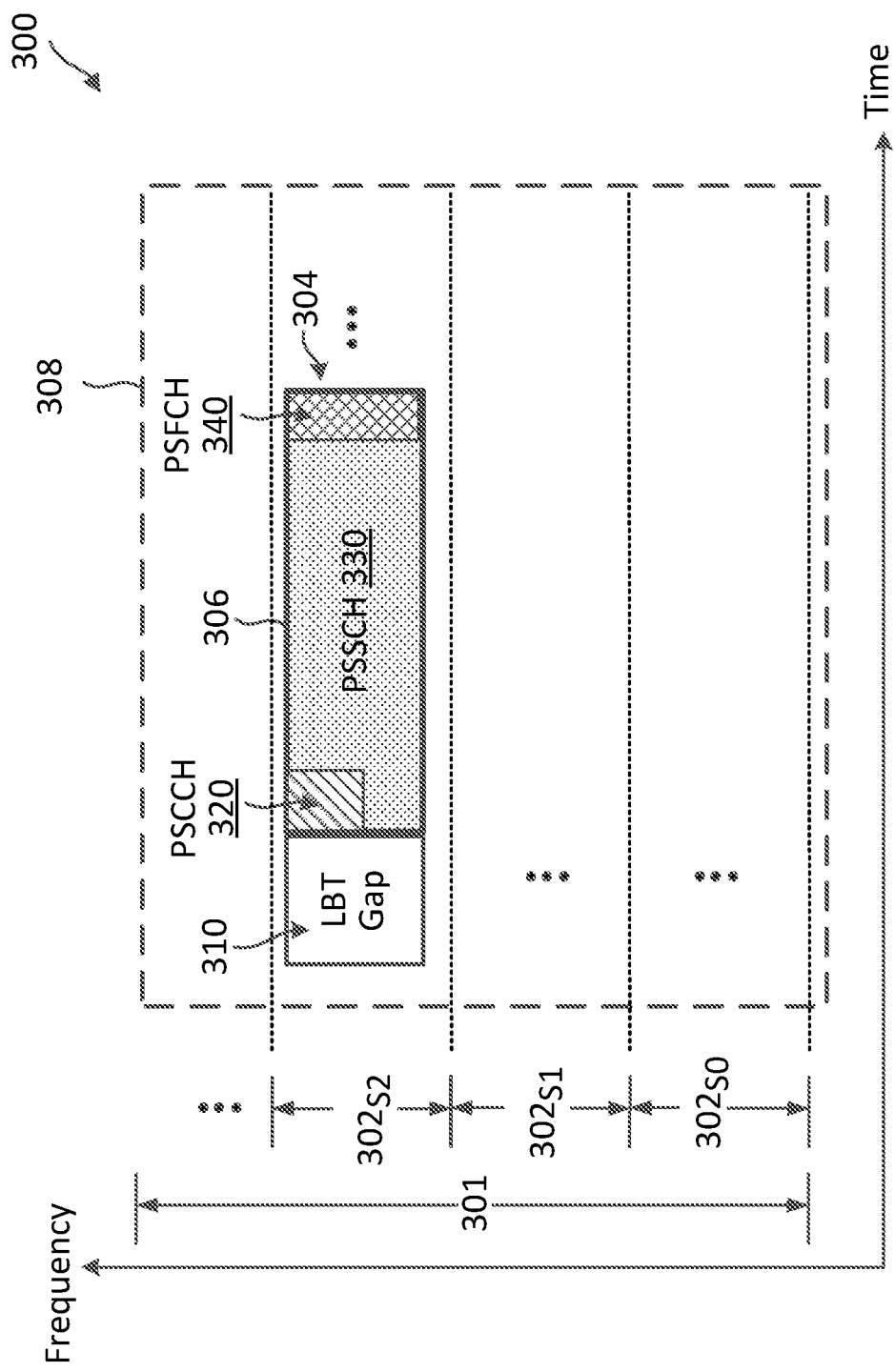
FIG. 3 illustrates a sidelink communication scheme in a wireless communication network according to some aspects of the present disclosure.

FIG. 3 illustrates a sidelink communication scheme 300 in a wireless communication network according to some aspects of the present disclosure. The scheme 300 may be employed by UEs such as the UEs 115 and/or 215 in a network such as the networks 100 and/or 200. In particular, sidelink UEs may employ the scheme 300 to contend for access in a shared radio frequency band (e.g., in a shared spectrum or an unlicensed spectrum) for sidelink communication. The shared radio frequency band may be shared by multiple RATs as discussed in FIG. 2. In FIG. 3, the x-axis represents time in some arbitrary units, and the y-axis represents frequency in some arbitrary units.

In scheme 300, a shared radio frequency band 301 is partitioned into a plurality of subchannels or frequency subbands 302 (shown as $302_{S0}$, $302_{S1}$, $302_{S2}$, . . . ) for sidelink communication. The frequency band 301 may be at any suitable frequencies. In some instances, the frequency band 301 is a 2.4 GHz unlicensed band. In some instances, the frequency band 301 is a 5 GHz unlicensed band. In some instances, the frequency band 301 is a 6 GHz unlicensed band. The frequency band 301 may have any suitable BW and may be partitioned into any suitable number of frequency subbands 302. The number of frequency subbands 302 can be dependent on the sidelink communication BW requirement. In some aspects, the frequency band 301 is a 2.4 GHz unlicensed band and may have a bandwidth of about 80 megahertz (MHz) partitioned into about fifteen 5 MHz frequency subbands 302.

A sidelink UE (e.g., the UEs 115 and/or 215) may be equipped with a wideband receiver and a narrowband transmitter. For instance, the UE may utilize the narrowband transmitter to access a frequency subband $302_{S2}$ for sidelink transmission utilizing a frame structure 304. The frame structure 304 is repeated in each frequency subband 302. In some instances, there can be a frequency gap or guard band between adjacent frequency subbands 302 as shown in FIG. 3, for example, to mitigate adjacent band interference. Thus, multiple sidelink data may be communicated simultaneously in different frequency subbands 302 (e.g., FDM). The frame structure 304 is also repeated in time. For instance, the frequency subband $302_{S2}$ may be time-partitioned into a plurality of frames with the frame structure 304. The frame structure 304 includes an LBT gap duration 310 followed by a sidelink resource 306. The LBT gap duration 310 is used for channel contention among devices of the same RAT or among devices of different RATs. Upon winning contention, the sidelink UE may utilize the sidelink resource 306 for transmission of control and user data.

The sidelink resource 306 may have a substantially similar structure as an NR sidelink resource. For instance, the sidelink resource 306 may include a number of subcarriers or RBs in frequency and a number of symbols in time. In some instances, the sidelink resource 306 may have a duration between about one millisecond (ms) to about 20 ms. The sidelink resource 306 may include a PSCCH 320, a PSSCH 330, and/or a physical sidelink feedback channel (PSFCH) 340. The PSCCH 320, the PSSCH 330, and the PSFCH 340 can be multiplexed in time and/or frequency. In the illustrated example of FIG. 3, the PSCCH 320 is located during the beginning symbol(s) (e.g., about 1 symbol or about 2 symbols) of the sidelink resource 306 and occupies a portion of the frequency subband $302_{S2}$. The PSFCH 340 is located at the ending symbol(s) of the sidelink resource 306. The PSSCH 330 occupies the remaining time-frequency resources in the sidelink resource 306. In general, the PSCCH 320, the PSSCH 330, and the PSFCH 340 may be multiplexed in any suitable configuration within the sidelink resource 306.

A sidelink UE (e.g., the UEs 115 and/or 215) intending to transmit in the frequency band 301 may perform a narrowband LBT in one or more frequency subbands 302. As an example, the sidelink UE may perform an LBT in the frequency subbands $302_{S2}$ during the LBT gap duration 310. The LBT may be an energy detection-based CAT4 LBT as discussed above with reference to FIG. 1. If the LBT is a pass (e.g., when the measured channel signal energy is below an energy detection threshold), the sidelink UE may proceed to transmit SCI and sidelink data to a peer sidelink UE in the sidelink resource 306. If the LBT fails (e.g., when the channel signal energy is above the energy detection threshold), the sidelink UE may refrain from transmitting in the sidelink resource 306. As such, the LBT can operate to gate access or occupancy in a frequency subband $302_{S2}$ and to facilitate coexistence with other technologies sharing the frequency band 301.

The sidelink UE may transmit the SCI in the PSCCH 320 and the sidelink data (e.g., user information data) in the PSSCH 330. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IoT data (e.g., sensor measurements, device measurements, temperature readings, etc.). The sidelink UE may also transmit a HARQ ACK/NACK in the PSFCH 340. The HARQ ACK/NACK may be a feedback for sidelink data received by the sidelink UE in an earlier sidelink resource 306. The SCI can indicate a reservation for a next sidelink resource 306. Thus, an intra-NR sidelink UE (e.g., a UE in the same NR-U sidelink system) may perform SCI sensing to determine whether a sidelink resource 306 is available or occupied for intra-NR sharing. For instance, if the intra-NR sidelink UE detected SCI indicating a reservation for the sidelink resource 306, the intra-NR sidelink UE may refrain from transmitting in the reserved sidelink resource 306. If the intra-NR sidelink UE determines that there is no reservation detected for a sidelink resource 306, the intra-NR sidelink UE may transmit in the sidelink resource 306. As such, SCI sensing can assist a UE in identifying a target frequency subband 302 to reserve for sidelink communication and to avoid collision (e.g., intra-NR collision) with another sidelink UE in the NR sidelink system. In some aspects, the intra-RAT sidelink UE may be configured with a sensing window for SCI sensing or monitoring to reduce intra-NR collision.

The SCI can also indicate scheduling information and/or a destination identifier (ID) identifying a target receiving sidelink UE for the next sidelink resource 306. Thus, a sidelink UE may monitor SCIs transmitted by other sideling UEs. Upon detecting SCI in a sidelink resource 306, the sidelink UE may determine whether the sidelink UE is the target receiver based on the destination ID. If the sidelink UE is the target receiver, the sidelink UE may proceed to receive and decode the sidelink data indicated by the SCI.

In some aspects, the scheme 300 is used for synchronous sidelink communication. In other words, the sidelink UEs are synchronized in time and are aligned in terms of symbol boundary, sidelink resource boundary (e.g., the starting time of sidelink resource 306), LBT gap duration boundary (e.g., the starting time of the LBT gap duration 310). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, a sidelink UE in the system may be preconfigured with a resource pool 308 in the frequency band 301, for example, while in a coverage of a serving BS. The resource pool 308 may include a plurality of sidelink resources 306 arranged as shown in the frame structure 304. The BS can configure the sidelink UE with a resource pool configuration indicating resources in the frequency band 301 and/or the subbands 302, the frame structure 304 (e.g., the LBT gap duration 310 and/or the sidelink resource 306), and/or timing information (e.g., LBT gap duration 310 start and end boundaries).

In some regions, government bodies may regulate LBT operations and/or transmissions in an unlicensed spectrum (e.g., 2.4 GHz bands). For instance, a wireless device may transmit up to a maximum duration of about 5 ms with a gap duration of about 5 ms between transmissions in a 2.4 GHz band without performing an LBT. However, if a wireless device accesses a 2.4 GHz band after an LBT, the wireless device may utilize a COT of about 5 ms to about 13 ms. Additionally, if a wireless device accesses a 2.4 GHz band after an LBT and utilizes frequency hopping for transmission, the wireless device may utilize a COT up to about 80 ms. As such, using an LBT in the NR sidelink framework as shown in the scheme 300 in a 2.4 GHz band can allow a sidelink to occupy a shared channel for a longer duration. Additionally, the scheme 300 can be used in conjunction with frequency hopping for sidelink transmission to further extend the duration of a COT when operating in a 2.4 GHz band. For instance, a sidelink UE may hop from one frequency subband 302 in one duration to another frequency subband 302 in a next duration for transmission within a COT as discussed in greater detail herein.

Figure 4:
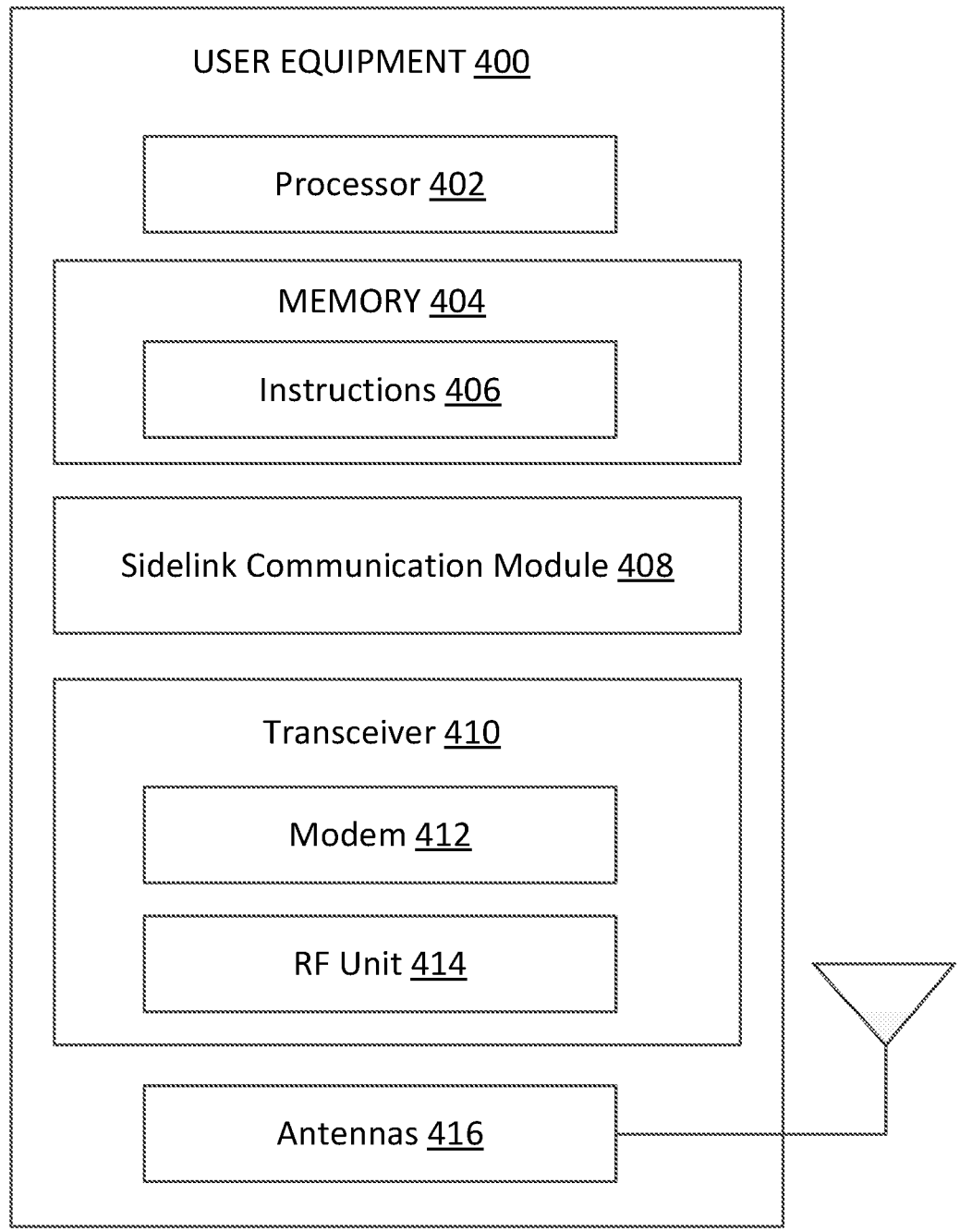
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1 or a UE 215 discussed above in FIG. 2. As shown, the UE 400 may include a processor 402, a memory 404, a sidelink communication module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 1-3 and 6-11. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink communication module 408 may be implemented via hardware, software, or combinations thereof. For example, the sidelink communication module 408 may be implemented as a processor, circuit, and/or instructions 406 stored in the memory 404 and executed by the processor 402. In some instances, the sidelink communication module 408 can be integrated within the modem subsystem 412. For example, the sidelink communication module 408 can be implemented by a combination of software components (e.g., executed by a DSP or a general processor) and hardware components (e.g., logic gates and circuitry) within the modem subsystem 412.

The sidelink communication module 408 may be used for various aspects of the present disclosure, for example, aspects of FIGS. 1-3 and 6-11. For instance, the sidelink communication module 408 is configured to operate in a mode-2 RRA for sidelink communication (e.g., using the frame structure 304 of FIG. 3), perform an LBT in a frequency subbband (e.g., the frequency subbands 302) during a LBT gap duration (e.g., the LBT gap duration 310), and determine whether to transmit in a sidelink resource (e.g., the sidelink resource 306) based the LBT. The sidelink communication module 408 is configured to transmit SCI (e.g., via a PSCCH) and sidelink data (e.g., via a PSSCH) in the sidelink resource upon passing the LBT (e.g., when channel signal energy measurement is below an energy detection threshold). Alternatively, the sidelink communication module 408 is configured to refrain from transmitting in the sidelink resource upon failing the LBT (e.g., when channel signal energy measurement is above an energy detection threshold).

In some aspects, the sidelink communication module 408 is configured to select a first LBT starting point from a plurality of LBT starting points within the LBT gap duration, for example, based on a priority of the sidelink data, to begin the LBT. For instance, if the sidelink data has a high priority, the sidelink communication module 408 is configured to select an earlier LBT starting point in the LBT gap duration. Alternatively, if the sidelink data has a low priority, the sidelink communication module 408 is configured to select a later LBT starting point in the LBT gap duration.

In some aspects, the sidelink communication module 408 is configured to reserve one or more LBT starting points in a next LBT gap duration (of a later sidelink communication frame) over one or more frequency subbands, for example, based on a priority of sidelink data to be transmitted in the later sidelink communication frame, generate the SCI to include the reservation and a priority of the reservation, monitor SCI from other sidelink UEs indicating LBT starting point reservations, determine whether to override a detected LBT starting point reservation based on a comparison between the priority of the detected reservation and the priority of the sidelink data to be transmitted in the later sidelink communication frame.

In some aspects, the sidelink communication module 408 is configured to perform frequency hopping in a sidelink communication according to a frequency hopping patter upon passing an LBT, compute a CBR and/or a CR based on the frequency hopping pattern and/or LBT results. In some aspects, the sidelink communication module 408 is configured to receive SSBs from a BS (e.g., the BSs 105 and/or 205), receive SSBs from a sidelink UE (e.g., the UEs 115 and/or 215), perform synchronization based on received SSBs, receive a sidelink configuration from a BS indicating a resource pool (e.g., the resource pool 308), a frequency hopping pattern, and/or sidelink communication frame structure (e.g., the frame structure 304), perform LBT and/or sidelink communication according to the received sidelink configuration. Mechanisms for sidelink communication over a shared radio frequency band or an unlicensed band using LBT and mode-2 RRA mechanisms are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the sidelink communication module 408 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 414 may be configured to process (e.g., perform analog to digital conversion or digital to analog conversion, etc.) modulated/encoded data (e.g., SCI, sidelink data, LBT starting point reservations, frequency hopping-aware CBRs, LBT-aware CRs, and/or frequency hopping and LBT-aware CRs) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., sidelink configuration, resource pool configuration, frequency hopping pattern, CBR/CR reporting configuration) to the sidelink communication module 408 for processing. The antennas 416 may include multiple antennas of similar or different designs in order to sustain multiple transmission links. The RF unit 414 may configure the antennas 416.

In some aspects, the transceiver 410 is configured to perform an LBT in a shared radio frequency band based on a first starting point of a plurality of starting points within an LBT gap duration and transmit, to a second UE (e.g., the UEs 115, 215, and/or 400), a first sidelink communication in the shared radio frequency band based on the LBT, the first sidelink communication including first SCI and first sidelink data, for example, by coordinating with the sidelink communication module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
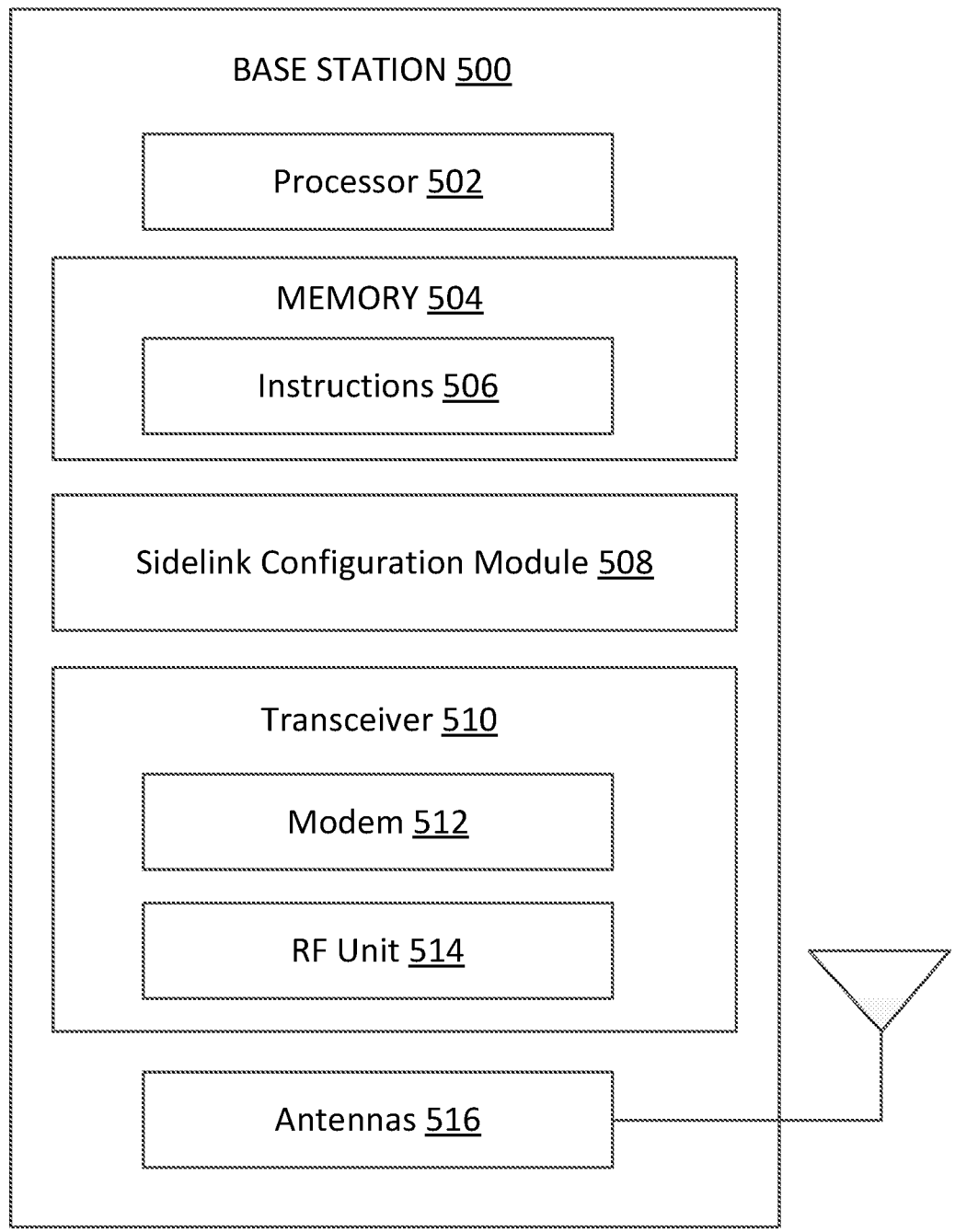
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 in the network 100 as discussed above in FIG. 1 or a BS 205 in the network 200 as discussed above in FIG. 2. As shown, the BS 500 may include a processor 502, a memory 504, a sidelink configuration module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-3 and 6-11. Instructions 506 may also be referred to as code, which may be interpreted broadly to include any type of computer-readable statement(s) as discussed above with respect to FIG. 4.

The sidelink configuration module 508 may be implemented via hardware, software, or combinations thereof. For example, the sidelink configuration module 508 may be implemented as a processor, circuit, and/or instructions 506 stored in the memory 504 and executed by the processor 502. In some instances, the sidelink configuration module 508 can be integrated within the modem subsystem 512. For example, the sidelink configuration module 508 can be implemented by a combination of software components (e.g., executed by a DSP or a general processor) and hardware components (e.g., logic gates and circuitry) within the modem subsystem 512.

The sidelink configuration module 508 may be used for various aspects of the present disclosure, for example, aspects of FIGS. 1-3 and 6-11. For instance, the sidelink configuration module 508 is configured to transmit, to a UE (e.g., the UEs 115, 215, and/or 400), a sidelink configuration indicating a sidelink resource pool, a frequency hopping pattern and/or transmit SSBs to facilitate synchronization at UEs. The sidelink configuration may indicate time-frequency resources for a sidelink resource pool (e.g., the frequency band 301, the frequency subbands 302, the sidelink communication frame structure 304, allowable LBT starting points within an LBT gap duration) and/or sidelink traffic priority classes. The frequency hopping pattern may indicate a sequence of frequency subbands for a UE to hop during transmissions within a channel dwell time (e.g., COT). In some aspects, the sidelink configuration module 508 is configured to transmit CBR and/or CR report configurations to UEs, receive frequency hopping aware-CBR reports, LBT-aware CR reports, and/or frequency hopping and LBT-aware CR reports from the UE, and/or control intra-sidelink collision. For instance, the sidelink configuration module 508 is configured to adjust the frequency hopping patterns at the UEs. Mechanisms for configuring sidelink UEs for channel access in a shared radio frequency band and/or an unlicensed band are described in greater detail herein.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., PDCCH, PDSCH, SSBs, sidelink configuration, sidelink resource pool configuration, SSBs, frequency hopping patterns for sidelink communication) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., frequency hopping aware-CBR reports, LBT-aware CR reports, and/or frequency hopping and LBT-aware CR reports) to the sidelink configuration module 508 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
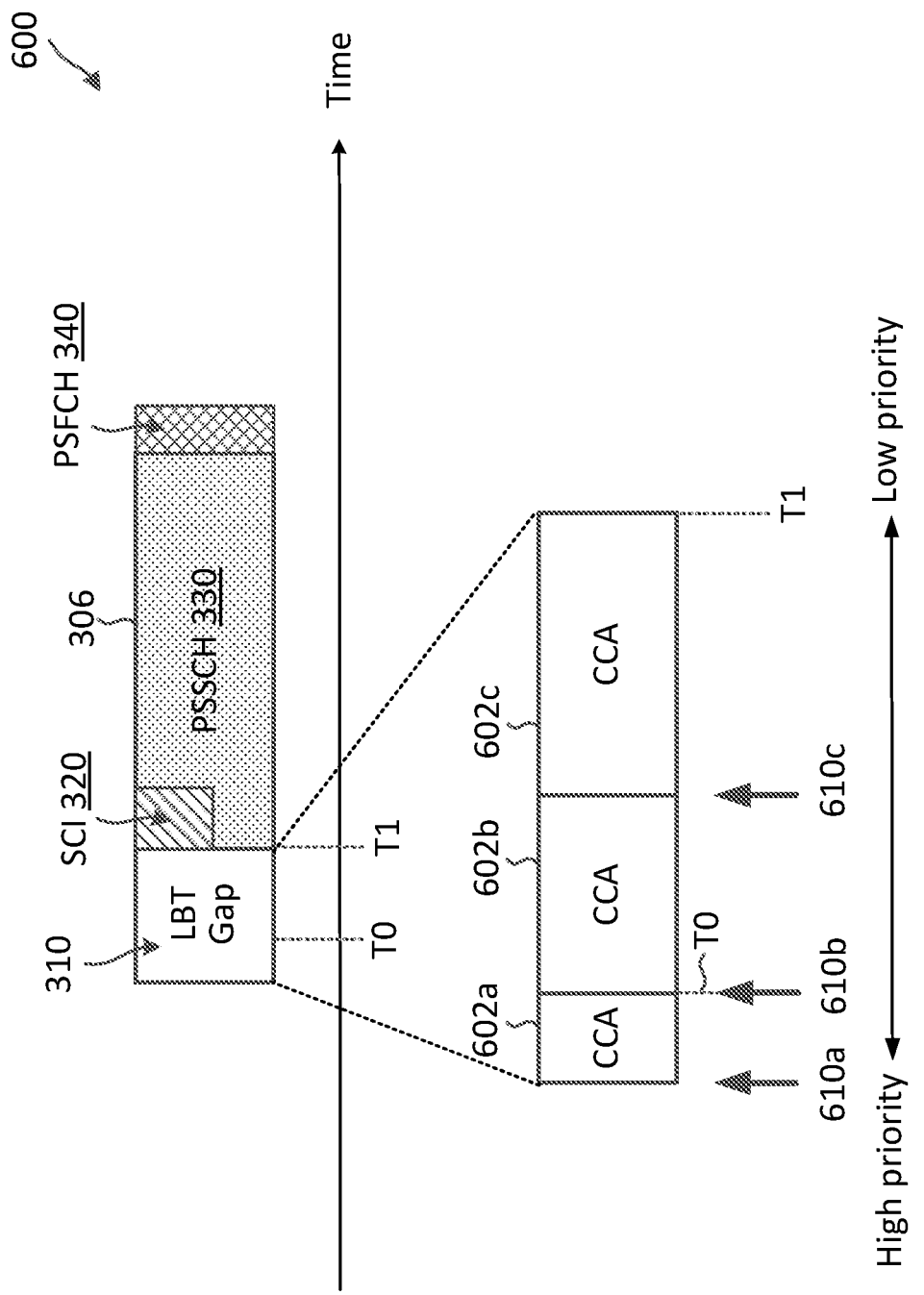
FIG. 6 is a timing diagram illustrating a sidelink listen-before-talk (LBT) scheme according to some aspects of the present disclosure.

FIG. 6 is a timing diagram illustrating a sidelink LBT scheme 600 according to some aspects of the present disclosure. The scheme 600 may be employed by UEs such as the UEs 115, 215, and/or 400 in a network such as the networks 100 and/or 200. In particular, a UE may perform LBT in a shared channel (e.g., the frequency band 301 and/or the frequency subbands 302) for sidelink transmission as shown in the scheme 600. In FIG. 6, the x-axis represents time in some arbitrary units. The scheme 600 is described using a similar sidelink frame structure 304 as in FIG. 3, and may use the same reference numerals as in FIG. 3 for simplicity's sake.

In the scheme 600, the LBT gap duration 310 may include multiple LBT starting points 610 (shown as 610a, 610b, and 610c). An LBT starting point 610 refers to a time when a sidelink UE may start to perform an LBT. Each LBT starting point 610 corresponds to the start of a CCA slot 602. As shown, the LBT starting point 610a is located at the beginning of the CCA slot 602a, the LBT starting point 610c is located at the beginning of the CCA slot 602c, and the LBT starting point 610c is located at the beginning of the CCA slot 602c. The duration of a CCA slot 602 refers to the duration when a sidelink UE may listen to the channel (e.g., performing signal energy measurement) to determine whether the channel is busy or available. The channel is busy when a channel signal energy measurement in the CCA slot 602 is above a threshold. The channel available when the channel signal energy measurement in the duration of the CCA slot 602 is below the threshold. For simplicity of illustration and discussion, FIG. 6 illustrates three LBT start points 610a, 610b, and 610c located at the beginning of CCA slots 602a, 602b, and 602c, respectively, in the LBT gap duration 310. However, an LBT gap duration may include any suitable number of LBT starting points 610 and corresponding CCA slots 602 (e.g., about 2, 4 or more).

A sidelink UE that has high-priority data for transmission may select an earlier LBT starting point, whereas a sidelink UE that has low-priority data for transmission may select a later LBT starting point. A sidelink UE that has data to transmit may perform an LBT beginning at a LBT starting point 610. The transmitting UE may listen to the channel (e.g., perform channel energy measurement) over the duration of a corresponding CCA slot 602. If the channel is clear during the CCA slot 602 (e.g., the channel signal energy measurement is below a threshold), the LBT is a pass and the UE may proceed to transmit in the shared channel. If the channel is detected to be busy (e.g., the channel signal measurement is above the threshold) during the CCA slot 602, the LBT fails and the UE may refrain from transmitting in the shared channel. If a high-priority UE passes an LBT at an earlier LBT starting point 610 (e.g., the LBT starting point 610a), the high-priority UE may proceed to transmit in the channel, and thus may block a low-priority UE starting an LBT at a later LBT starting point 610 (e.g., the LBT starting point 610b). Accordingly, the use of multiple LBT starting points 610 can assist in controlling intra-technology collision (e.g., among NR sidelink UEs).

In some aspects, after a high-priority sidelink UE passes an LBT at the end of the CCA slot 602a (e.g., at time T0), the sidelink UE may transmit a filler signal to occupy the channel until the time when the sidelink resource 306 begins (e.g., at time T1). In other words, the filler signal may begin at the next LBT starting point 610b and continue to the start of the sidelink resource 306. The sidelink UE may transmit sidelink transmission aligned to a predetermined boundary or predetermined start of a sidelink resource 306 (e.g., SCI starting symbol boundary). The predetermined boundary may be a common boundary cross all sidelink UEs in the sidelink system or network (e.g., based on a synchronization to SSBs transmitted by a BS such as the BSs 105, 205, and/or 500 or a sidelink UE). As such, a monitoring UE may begin SCI monitoring or sensing at the sidelink resource 306 boundary. The filler signal beginning at the LBT starting point 610b and continuing to the start of the sidelink resource 306 may gate other UEs or devices starting an LBT at the later LBT starting point 610b or 610c from accessing the channel. In some instances, the filler signal can be a predetermined sequence or a predetermined signal waveform (e.g., to ease detection at a monitoring or receiving UE).

In some other aspects, a sidelink UE passing an LBT may begin a sidelink transmission immediately. For instance, upon passing an LBT at time T0, the sidelink UE may start a sidelink transmission at time T0. In other words, the sidelink resource 306 may begin at an earlier time (e.g., at time T0). As such, when utilizing the scheme 300 with the frequency subbands 302 as shown in FIG. 3, a SCI monitoring or sensing UE may have a different SCI monitoring or sensing start time for different frequency subbands (e.g., the frequency subbands 302). For example, the SCI monitoring or sensing start time across the frequency subbands 302 may have a zig-zag pattern. Thus, while the immediate sidelink transmission may be more efficient in utilizing resources, it can be more complex for SCI sensing. For instance, a peer UE or other sidelink UEs may perform continuous monitoring and search for SCI at different boundaries since the monitoring UE may not be aware when a transmitting UE may pass an LBT. In some instances, upon passing an LBT at time T0, the sidelink UE may start a PSSCH sidelink data transmission at time T0 and transmit the SCI at the boundary of the sidelink resource, and thus a monitoring sidelink UE may perform SCI sensing at the sidelink resource boundary. However, a target receiving sidelink UE may have to buffer received signal and decode the sidelink data from the buffered signal upon detecting the SCI and determining that the PSSCH sidelink data transmission is destined to the target receiving sidelink UE.

In some aspects, after a high-priority UE failing an LBT at an early LBT starting point (e.g., the LBT starting point 610a), the high-priority UE may perform another LBT at a later LBT starting point (e.g., the LBT starting point 610b). In other words, a high-priority UE may have multiple contention opportunities. The high-priority UE may perform an LBT from an earliest LBT starting point (e.g., the LBT starting point 610a) to a latest LBT starting point (e.g., the LBT starting point 610c) in an LBT gap duration (e.g., the LBT gap duration 310) and may access the channel after a successful LBT. Conversely, a low-priority UE may have a single contention opportunity to perform an LBT at a latest LBT starting point (e.g., the LBT starting point 610c) within an LBT gap duration 310.

In some aspects, the CCA slots 602 within an LBT duration 310 may have the same duration. In other aspects, the CCA slots 602 within an LBT duration 310 may have different durations. In the illustrated example of FIG. 6, the CCA slots 602 have different durations, where an earlier CCA slot has a shorter duration than a later CCA slot 602. In other words, the CCA slots 602 in the LBT gap duration 310 have an increasing duration. For instances, the CCA slot 602a may have a duration of about 1 OFDM symbol (e.g., about 35 μs long), the CCA slots 602b may have a duration of about 2 symbols, and the CCA slot 602c may have a duration of about 3 symbols. The increasing CCA slot durations may further provide a higher priority sidelink UE using an earlier CCA slot 602 with a greater opportunity to gain access to the shared channel. In other words, the CCA slots 602 and/or the LBT starting points 610 have a decreasing priority in the LBT gap duration 310 (as shown in FIG. 6). In some instances, the later CCA slots 602b and 602c in the LBT gap duration 310 with the longer duration may be referred to as extended CCA (eCCA) slots.

Figure 7:
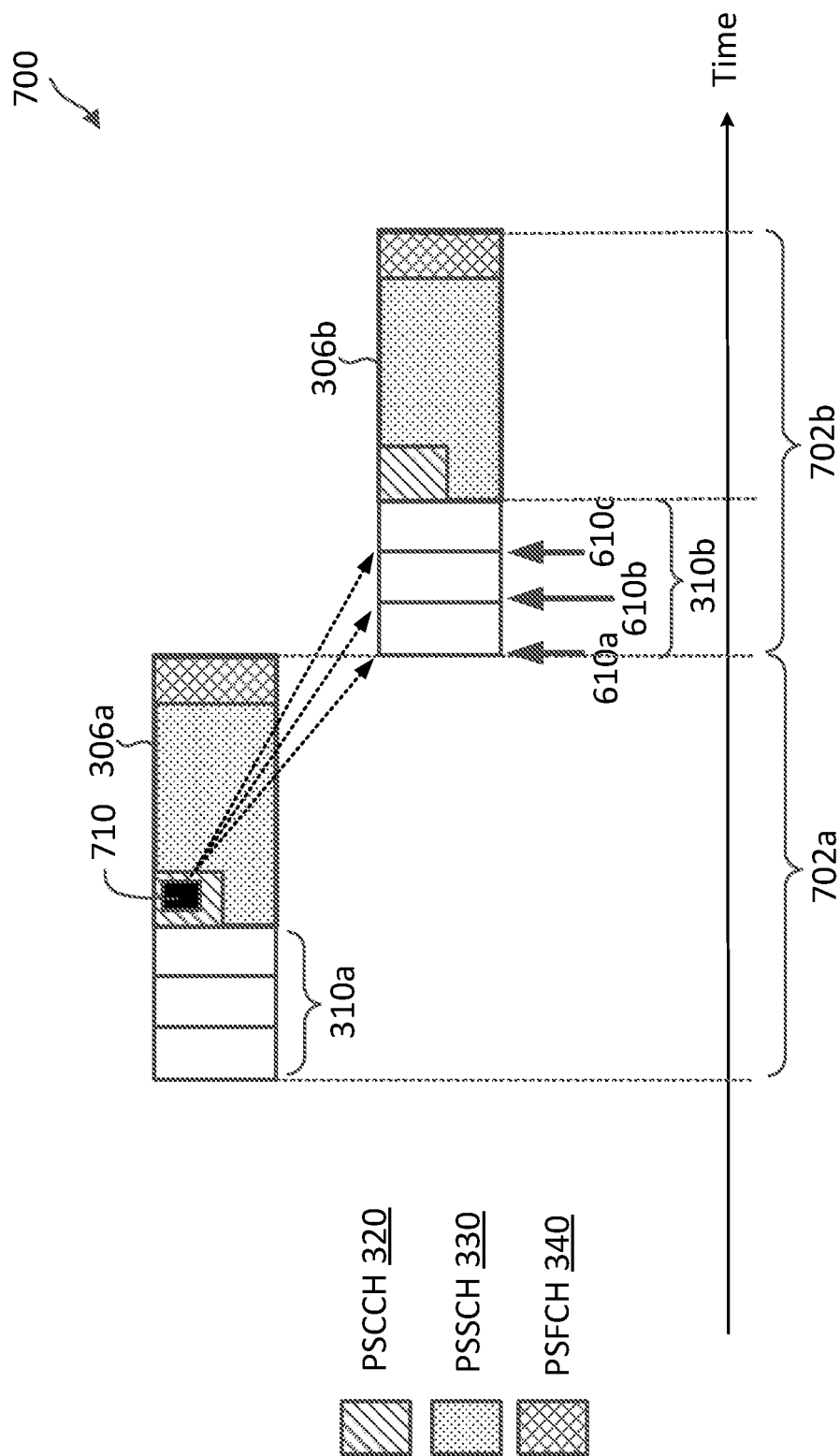
FIG. 7 is a timing diagram illustrating a sidelink LBT scheme according to some aspects of the present disclosure.

FIG. 7 is a timing diagram illustrating a sidelink LBT scheme 700 according to some aspects of the present disclosure. The scheme 700 may be employed by UEs such as the UEs 115 and/or 215 in a network such as the networks 100 and/or 200. In particular, a UE may perform LBT in a shared channel (e.g., the frequency band 301 and/or the frequency subbands 302) for sidelink transmission as shown in the scheme 700. In FIG. 7, the x-axis represents time in some arbitrary units. The scheme 700 is described using a similar sidelink frame structure 304 as in FIG. 3, and may use the same reference numerals as in FIG. 3 for simplicity's sake.

In the scheme 700, a sidelink UE (e.g., the UEs 115 and/or 215) may reserve one or more LBT starting point in an LBT gap duration 310 at a later time. In the illustrated example of FIG. 7, the sidelink UE passes an LBT during the LBT gap duration 310a in the time period 702a. The sidelink UE transmits SCI 710 in the PSCCH 320 of the sidelink resource 306a and may transmit sidelink data in the PSSCH 330 of the sidelink resource 306a. The SCI 710 can indicate a reservation for one or more LBT starting points 610 within an LBT gap duration 310*b* in a next time period 702*b*. In some instances, the SCI 710 may reserve all LBT starting points 610*a*, 610*b*, and 610*c* as shown by the dotted arrows. In general, a SCI may randomly reserve one or more of a plurality of LBT starting points in an LBT gap duration for opportunistic LBT in a TDM manner.

In some aspects, the sidelink UE may determine which of the plurality of LBT starting points 610 in the LBT gap duration 310*b* to reserve based on a priority of sidelink data to be communicated in the PSSCH 330 of the sidelink resource 306*b* in the time period 702*b*. The higher the priority the of the sidelink data, the earlier the LBT starting point 610 may be reserved for channel access. In this regard, if the sidelink data has a high priority, the sidelink UE may reserve the LBT starting point 610*a* in the LBT gap duration 310*b* and include, in the SCI 710, a reservation for the LBT starting point 610*a*. Alternatively, if the sidelink data has a low priority, the sidelink UE may reserve the later LBT starting point 610*c* in the LBT gap duration 310*b* and include, in the SCI 710, a reservation for the LBT starting point 610*c*. In some aspects, the higher the priority the of the sidelink data, the greater number of LBT starting points 610 or the larger set of LBT starting points 610 may be reserved for channel access. In this regard, if the sidelink data has a high priority, the sidelink UE may reserve two LBT starting points 610 (e.g., the LBT starting points 610*a* and 610*b*) in the LBT gap duration 310*b* and include, in the SCI 710, a reservation for the two LBT starting points 610. Alternatively, if the sidelink data has a low priority, the sidelink UE may reserve a less number of LBT starting point 610 (e.g., a single LBT starting point 610*c*) and include, in the SCI 710, a reservation for the LBT starting point 610*c*. In some instances, a sidelink UE may reserve all LBT starting points 610 (e.g., the LBT starting points 610*a*, 610*b*, and 610*c*) in the LBT gap duration 310*b* for channel access when the sidelink data to be transmitted is of a high priority.

Figure 8:
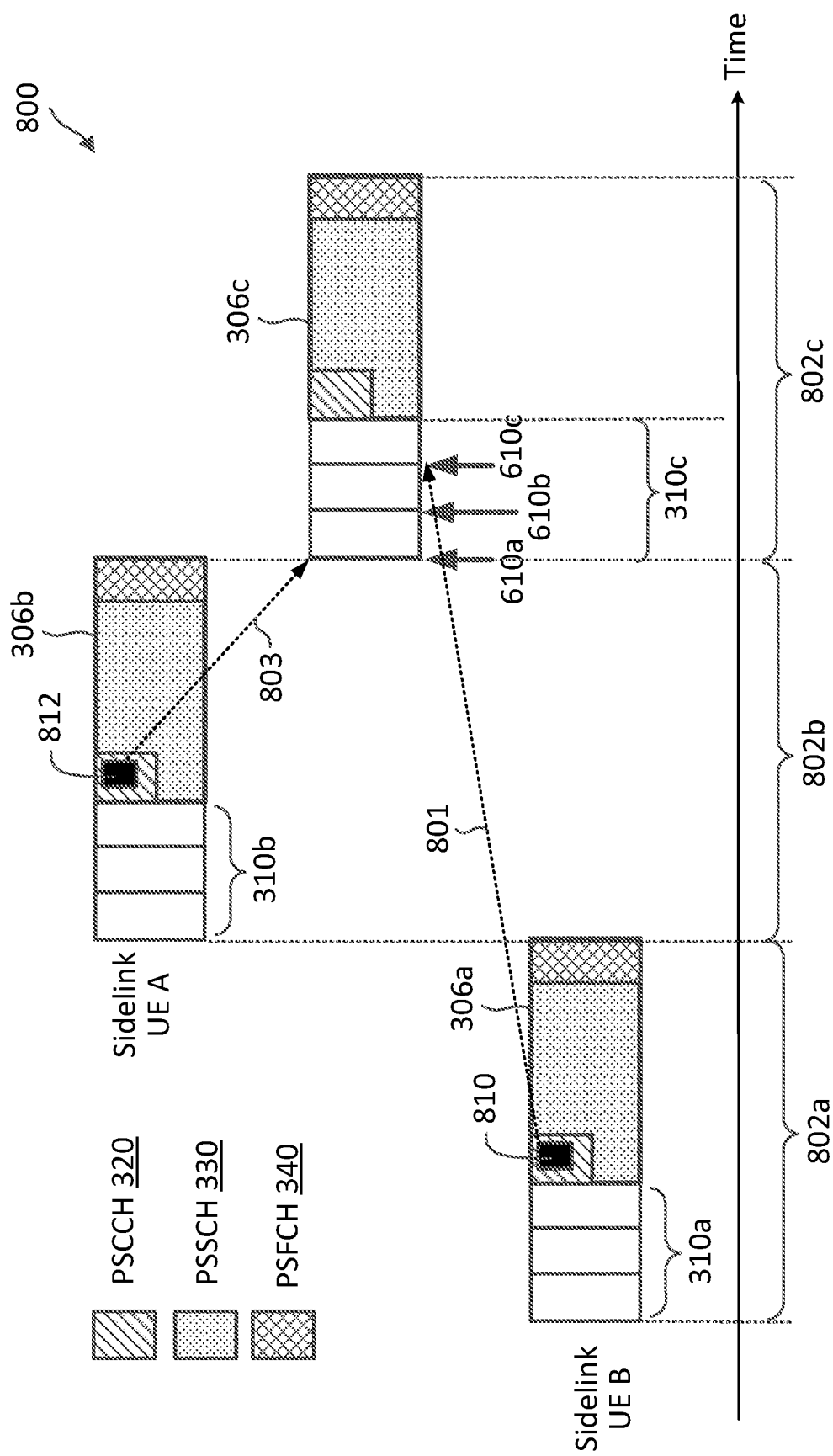
FIG. 8 is a timing diagram illustrating a sidelink LBT scheme according to some aspects of the present disclosure.

FIG. 8 is a timing diagram illustrating a sidelink LBT scheme 800 according to some aspects of the present disclosure. The scheme 800 may be employed by UEs such as the UEs 115 and/or 215 in a network such as the networks 100 and/or 200. In particular, a UE may perform LBT in a shared channel (e.g., the frequency band 301 and/or the frequency subbands 302) for sidelink transmission as shown in the scheme 800. In FIG. 8, the x-axis represents time in some arbitrary units. The scheme 800 is described using a similar sidelink frame structure 304 as in FIG. 3, and may use the same reference numerals as in FIG. 3 for simplicity's sake.

In the scheme 800, a sidelink UE A (e.g., the UEs 115 and/or 215) may reserve an earlier LBT starting point 610 within a LBT gap duration 310 when a later LBT starting point 610 is reserved by another sidelink UE B. In other words, the scheme 800 allows for opportunistic overriding of a low-priority reservation. In the illustrated example of FIG. 8, the sidelink UE B passes an LBT during the LBT gap duration 310*a* in the time period 802*a*. The sidelink UE B transmits SCI 810 in the PSCCH 320 of the sidelink resource 306*a* and may transmit sidelink data in the PSSCH 330 of the sidelink resource 306*a*. The SCI 810 indicates a reservation for the LBT starting point 610*c* in an LBT gap duration 310*c* during a time period 802*c* as shown by the dotted arrow 801. In some instances, the SCI 810 may include an indication of a priority of the sidelink data to be transmitted in the sidelink resource 306*c* in the time period 802*c*.

Subsequently, the sidelink UE A passes an LBT during the LBT gap duration 310*b* in the time period 802*b*. The sidelink UE A transmits SCI 812 in a PSCCH 320 of the sidelink resource 306*b* and may transmit sidelink data in the PSSCH 330 of the sidelink resource 306*b*. The sidelink UE A may determine that the sidelink data to be transmitted in the sidelink resource 306*c* during the time period 802*c* is of a higher priority than the reservation indicated by the SCI 810. Thus, the sidelink UE A may reserve an LBT starting point (e.g., the LBT starting point 610*a*) in the LBT gap duration 310*c* earlier than the LBT starting point 610*c* reserved by the sidelink UE B. The sidelink UE A includes, in the SCI 812, a reservation for the LBT starting point 610*a* as shown by the dotted arrow 803. Similarly, the SCI 812 can additionally include an indication of the priority of sidelink data to be transmitted in the sidelink resource 306*c* during the time period 802*c*.

During the time period 802*c*, the high-priority sidelink UE A may start to perform an LBT beginning at the reserved LBT starting point 610*a*. If the sidelink UE A wins the contention (e.g., the LBT is a pass), the sidelink UE A may start to transmit in the channel (e.g., a filler signal or an SCI) as discussed above in the scheme 600 with reference to FIG. 6. Thus, the low-priority sidelink UE B may fail the LBT that starts at the later LBT starting point 610*c*. In some instances, the channel may be busy during the time (e.g., in the CCA slot 602*a*) when the high-priority sidelink UE A performs CCA or LBT, and thus the high-priority UE A may fail the LBT. The channel may be subsequently available during the time (e.g., in the CCA slot 602*c*) when the low-priority UE B performs CCA or LBT, and thus the low-priority sidelink UE may pass the LBT and gain access to the channel.

Figure 9:
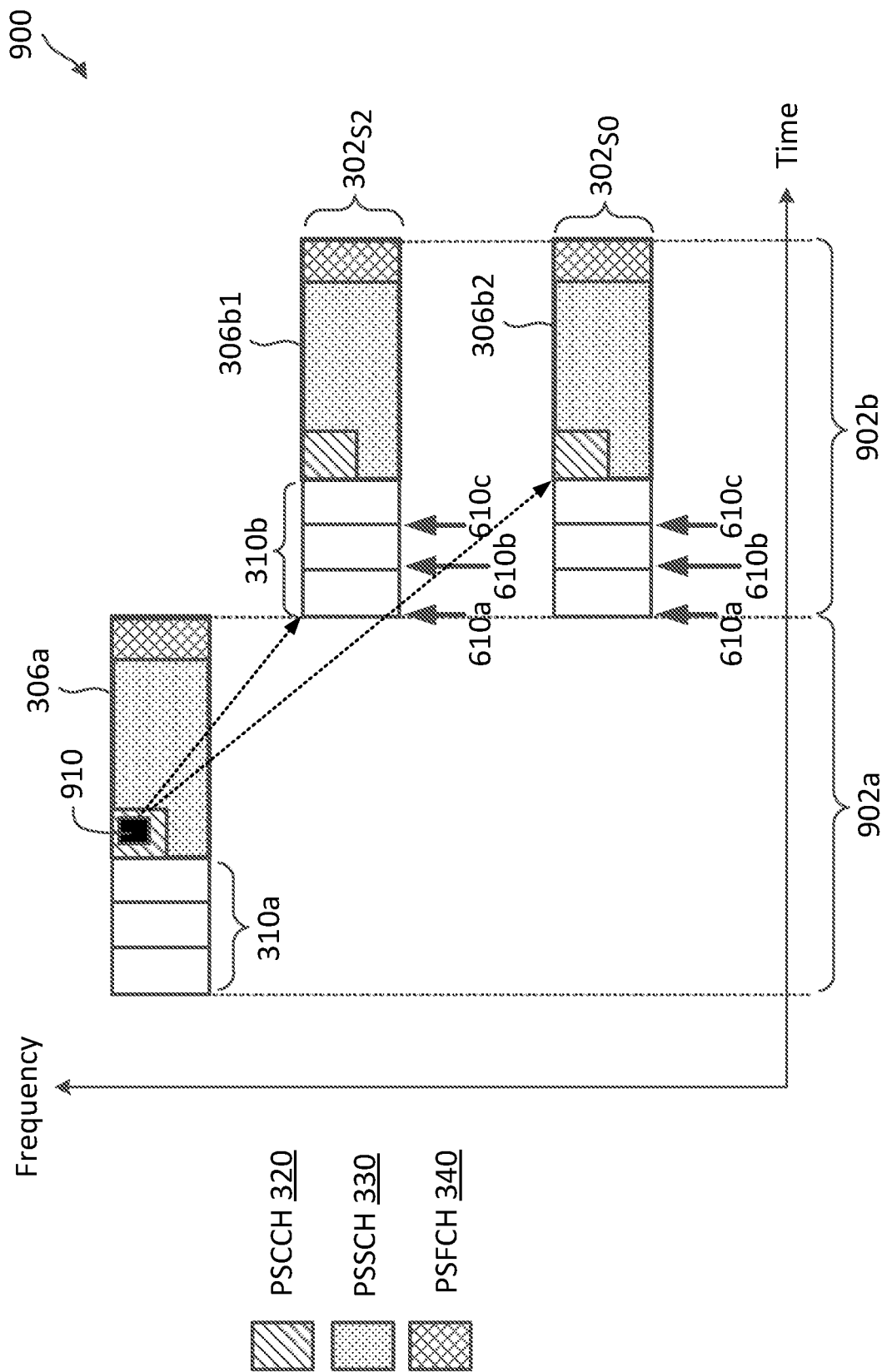
FIG. 9 illustrates a sidelink LBT scheme according to some aspects of the present disclosure.

FIG. 9 illustrates a sidelink LBT scheme 900 according to some aspects of the present disclosure. The scheme 900 may be employed by UEs such as the UEs 115 and/or 215 in a network such as the networks 100 and/or 200. In particular, a UE may perform LBT in a shared channel (e.g., the frequency band 301 and/or the frequency subbands 302) for sidelink transmission as shown in the scheme 900. In FIG. 9, the x-axis represent time in some arbitrary units, and the y-axis represents frequency in some arbitrary units. The scheme 900 is described using a similar sidelink frame structure 304 as in FIG. 3, and may use the same reference numerals as in FIG. 3 for simplicity's sake.

In the scheme 900, a sidelink UE (e.g., the UEs 115 and/or 215) may reserve different LBT starting points at different frequency subbands within a channel or frequency band. In the illustrated example of FIG. 9, the sidelink UE passes an LBT during the LBT gap duration 310*a* in the time period 902*a*. The sidelink UE transmits SCI 910 in the PSCCH 320 of the sidelink resource 306*a* and may transmit sidelink data in the PSSCH 330 of the sidelink resource 306*a*. The SCI 910 indicates a reservation for an LBT starting point 610*a* in the frequency subband $302_{S2}$ and an LBT starting point 610*c* in the frequency subband $302_{S0}$ within an LBT gap duration 310*b* during a time period 902*b* as shown by the dotted arrows. In some instances, the sidelink UE may transmit the SCI 910 in a frequency subband 302 different than the frequency subbands $302_{S2}$ and $302_{S0}$ where the reserved LBT starting points 610 are located. In some other instances, the sidelink UE may transmit the SCI 910 in the frequency subband $302_{S2}$ or the frequency subband $302_{S0}$ where a reserved LBT starting point 610 is located.

During the time period 902*b*, the sidelink UE may start to perform an LBT in the frequency subband $302_{S2}$ beginning at the earlier LBT starting point 610*a*. If the LBT in the frequency subband $302_{S2}$ is a pass, the sidelink UE may transmit in the sidelink resource $306b1$ in the frequency subband $302_{S2}$. If the LBT in the frequency subband $302_{S2}$ fails, the sidelink UE may hop to the frequency subband $302_{S0}$ and begins an LBT at the later LBT starting point $610c$ in the frequency subband $302_{S0}$. If the LBT in the frequency subband $302_{S2}$ is a pass, the sidelink UE may transmit in the sidelink resource $306b2$ in the frequency subband $302_{S0}$. If the LBT in the frequency subband $302_{S0}$ fails, the sidelink UE may refrain from transmitting in the frequency subband $302_{S0}$.

As can be observed, the scheme 900 allows for LBT-aware hopping within a same dwell time (e.g., the time period 902b). The reservation of different LBT starting points 610 in different frequency subbands 302 within the dwell time can increase the chance of a UE in gaining access to the channel.

The provision of multiple LBT starting points (e.g., the LBT starting points 610a, 610b, and 610c) and LBT starting point reservations as shown in the schemes 600, 700, 800, and/or 900 discussed above can be beneficial to NR sidelink operating over an unlicensed band (e.g., a 2.4 GHz band). For instance, NR sidelink system is designed to utilize retransmissions to handle intra-system collisions among sidelink UEs. An NR sidelink collision may occur over a relatively short NR sidelink subchannel or sidelink resource 306 duration (e.g., about 1 slot or a 1 ms duration). Thus, the occurrence of a sidelink collision may impact a short duration. As such, the resource wastage may be relatively insignificant. However, when operating over an unlicensed spectrum, the channel access or LBT overhead can be significant for a short sidelink subchannel duration, and thus a sidelink collision may significantly impact the performance and resource utilization of the system and can become intolerable. The multiple LBT starting points and LBT starting point reservations can allow channel access to be prioritized among the sidelink UEs. The prioritized access can reduce collisions among the intra-system sidelink UEs.

In some aspects, the channel access priority of a sidelink UE can be time-dependent. For instance, at a first time instant, a sidelink UE may reserve a later LBT starting point (e.g., the LBT starting point 610c) in a first LBT gap duration (e.g., the LBT gap duration 310) for a sidelink data transmission. At a second time instant, the sidelink UE may reserve an earlier LBT starting point (e.g., the LBT starting point 610b) in a second LBT gap duration for a sidelink data transmission. At a third time instant, the sidelink UE may reserve an earliest LBT starting point (e.g., the LBT starting point 610a) in a third LBT gap duration for a sidelink data transmission. Some example use cases may include V2X applications, where a vehicle (e.g., a sidelink UE) may determine which LBT starting point to reserve in an LBT gap duration (e.g., the LBT gap duration 310) based on the urgency of an upcoming data transmission. For instance, in a V2X application, a vehicle may broadcast detected objects (via sidelink) in a road system to inform other vehicles of road conditions and/or road hazards. If the vehicle detected a stationary object, the vehicle may reserve a later LBT starting point to transmit V2X data (e.g., sidelink data) to report the stationary object as the positional information of the stationary object may be relatively static. If the vehicle detected a moving object, the vehicle may reserve an earlier LBT starting point to transmit V2X data (e.g., sidelink data) to report the moving object as the positional information of the moving may be valid over a short time. If the vehicle determines the moving object may cause a road hazard and as the moving object approaches the location where the road hazard may occur, the vehicle may reserve an earliest LBT starting to transmit V2X data to report the moving object as the positional information of the moving object may be critical for other vehicles to take actions. As such, the prioritized channel access provided by the multiple LBT starting points and/or LBT starting reservations can better serve sidelink applications that have time-varying transmission requirements. It should be understood that the described use case is exemplary and there are numerous other use cases for the present invention.

Figure 10:
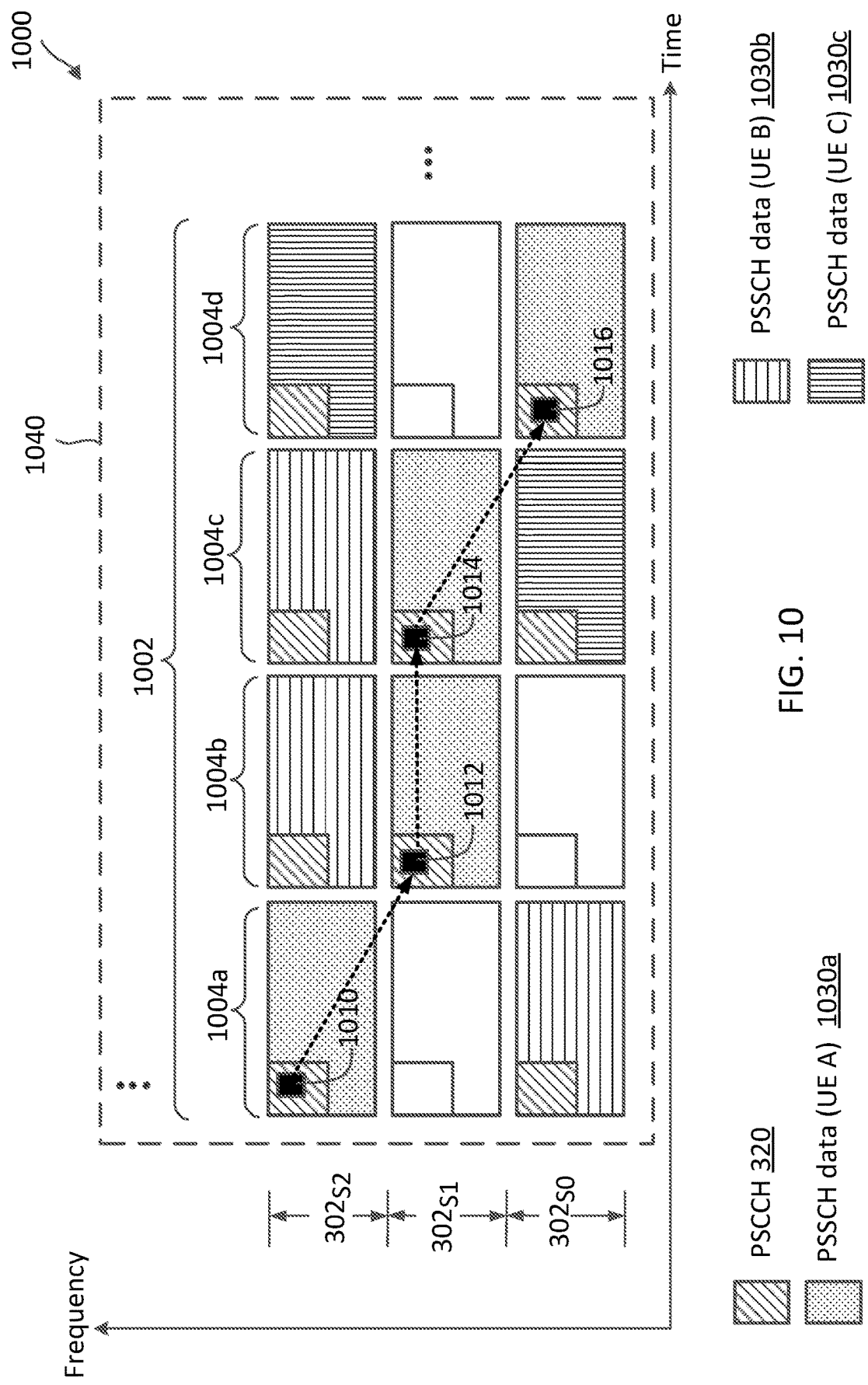
FIG. 10 illustrates a sidelink frequency-hopping scheme according to some aspects of the present disclosure.

FIG. 10 illustrates a sidelink frequency hopping scheme 1000 according to some aspects of the present disclosure. The scheme 1000 may be employed by UEs such as the UEs 115 and/or 215 in a network such as the networks 100 and/or 200. In particular, a UE may perform LBT in a shared channel (e.g., the frequency band 301 and/or the frequency subbands 302) for sidelink transmission as shown in the scheme 1000. In FIG. 10, the x-axis represent time in some arbitrary units, and the y-axis represents frequency in some arbitrary units. The scheme 1000 is described using a similar sidelink frame structure 304 as in FIG. 3, and may use the same reference numerals as in FIG. 3 for simplicity's sake.

In the scheme 1000, a sidelink UE A (e.g., the UEs 115 and/or 215) may perform frequency hopping during a COT 1002. In this regard, the sidelink UE may be configured with a frequency hopping pattern. In some instances, the sidelink UE may receive a frequency hopping pattern configuration from a serving BS (e.g., the BSs 105, 205, and/or 500) while in a coverage of the serving BS. In the illustrated example of FIG. 10, the frequency hopping pattern for the UE A may include the frequency subband $302_{S2}$, $302_{S1}$, $302_{S2}$, and $302_{S0}$ in sequence as shown by the dotted arrows. The frequency hopping pattern may be repeated, for example, the sidelink UE may hop from the frequency subband $302_{S0}$ back to the frequency subband $302_{S2}$ and repeat the frequency hopping pattern shown in FIG. 10. The sidelink UE may acquire the COT 1002 by performing an LBT using similar mechanisms as discussed above in the schemes 300, 600, 700, 800, and/or 900 with reference to FIGS. 3, 4, 7, 8, and/or 9, respectively.

The COT 1002 includes a plurality of time slots or time periods 1004. Each time period 1004 may include a sidelink resource 306. During the time period 1004a, the sidelink UE A transmits SCI 1010 in the PSCCH 320 of the sidelink resource 306 located at the frequency subband $302_{S2}$. The SCI 1010 indicates a reservation in the time period 1004b for a sidelink resource 306 at the frequency subband $302_{S1}$ (which is a next hop according to the frequency hopping pattern). The sidelink UE A may also transmit PSSCH data 1030a in the PSSCH (e.g., the PSSCH 330) of the sidelink resource 306 at the frequency subband $302_{S2}$.

During the time period 1004b, the sidelink UE A transmits SCI 1012 in the PSCCH 320 of the sidelink resource 306 located at the frequency subband $302_{S1}$. The SCI 1012 indicates a reservation in the time period 1004b for a sidelink resource 306 at the frequency subband $302_{S1}$ (which is a next hop according to the frequency hopping pattern). The sidelink UE A may also transmit PSSCH data 1030a in the PSSCH (e.g., the PSSCH 330) of the sidelink resource 306 at the frequency subband $302_{S1}$ based on the reservation indicated by the SCI 1010.

During the time period 1004c, the sidelink UE A transmits SCI 1014 in the PSCCH 320 of the sidelink resource 306 located at the frequency subband $302_{S1}$. The SCI 1014 indicates a reservation in the time period 1004d for a sidelink resource 306 at the frequency subband $302_{S0}$ (which is a next hop according to the frequency hopping pattern). The sidelink UE A may also transmit PSSCH data 1030a in the PSSCH (e.g., the PSSCH 330) of the sidelink resource 306 at the frequency subband $302_{S1}$ based on the reservation indicated by the SCI 1012.

During the time period 1004d, the sidelink UE A may transmit SCI 1016 and PSSCH data 1030a in the PSCCH 320 and PSSCH (e.g., the PSSCH 330) of the sidelink resource 306, respectively, at the frequency subband $302_{S0}$ based on the reservation indicated by the SCI 1014.

As shown in the scheme 1000, another sidelink UE B may be configured with a different frequency hopping pattern than the sidelink UE A and transmit PSSCH data 1030b using a sidelink resource 306 in a different frequency subband 302 than the sidelink UE A during the same time period. Similarly, a sidelink UE C may be configured with a different frequency hopping pattern than the sidelink UE A and UE B and transmit PSSCH data 1030c using a sidelink resource 306 in a different frequency subband 302 than the sidelink UE A or the sidelink UE C during the same time period The frequency hopping can allow for interference averaging over the duration of the COT 1002. As such, in some instance, a COT can have a longer duration when frequency hopping is applied. For instance, a COT acquired based on an energy detection-based LBT may have a duration of about 13 ms without frequency hopping and may have a longer or extended duration of up to about 80 ms with frequency hopping. Thus, a COT with frequency hopping may include several to tens of slots (e.g., time periods 1004). The frequency hopping channel access may also be referred to as a digital modulation (DM) channel access.

The scheme 1000 with the frequency hopping may be suitable for sidelink deployment over a 2.4 GHz unlicensed band with a regulation for channel access to utilize frequency hopping. For instance, a sidelink UE (e.g., the sidelink UE A, the sidelink UE B, and/or the sidelink UE C) may be configured by a serving BS (e.g., the BSs 105, 205, and/or 500) to operate using mode-2 RRA mechanisms for sidelink communication. The sidelink UE may receive a sidelink resource pool configuration from the serving BS. The sidelink resource pool configuration may indicate a resource pool 1040 (e.g., the resource pool 308) in a 2.4 GHz unlicensed band. The BS may further configure the sidelink UE with a frequency hopping pattern for accessing the resource pool. The sidelink UE may perform channel access in the resource pool using mechanisms as shown in the scheme 1000.

In some aspects, a regulation may also restrict transmissions from a node (e.g., the UEs 115, 215, and/or 400 and/or BSs 105, 205, and/or 500) in a certain unlicensed band to be have a maximum transmission time of about 5 ms with a minimum gap time of about 5 ms between transmissions.

In a sidelink system or network (e.g., the networks 100 and/or 200), a CBR and/or a CR may be used for congestion control and/or intra-system, intra-operator, and/or intra-technology collision avoidance. A CBR is a metric indicating a number of subchannels (e.g., the frequency subbands 302) in a sidelink resource pool (e.g., the resource pool 1040) with a measured receive signal strength indicator (RSSI) greater than a preconfigured threshold divided by the total number of subchannels in the resource pool. The CBR metric can be computed for a certain number of time intervals or subframes (e.g., the time periods 702, 802, 902, and/or 1002). The CBR can provide an estimation on the total state of a channel. In some instances, a sidelink UE may compute a CBR by measuring RSSI in the subchannels within the resource pool over a time interval including a number of subframes (e.g., about 100), counting the number of subchannels with an RSSI above the preconfigured threshold in the time interval (e.g., a subchannel count), and dividing the subchannel count by the total number of subchannels in the resource pool. In some instances, the sidelink UE may be configured, for example, by a serving BS, with a CBR reporting configuration (e.g., a CBR measurement time interval) to report a CBR to the BS.

In some aspects, when a sidelink system utilizes frequency hopping as shown in the scheme 1000, a sidelink UE (e.g., the UEs 115, 215, and/or 400) may determine a frequency hopping-aware CBR. In this regard, the sidelink UE may be configured with a frequency hopping pattern and may consider the number of subchannels or frequency subbands that in the frequency hopping pattern when computing the CBR. In this regard, the sidelink UE may adjust the CBR by configuring the denomination for the CBR based on a total number of frequency subbands assigned and/or allowed by the frequency hopping pattern instead of a total number of frequency subbands in the resource pool. For instance, a sidelink resource pool (e.g., the sidelink resource pool 308 and/or 1040) may have 10 frequency subbands, and the sidelink UE may have be configured with a frequency hopping pattern including 5 frequency subbands. To compute the frequency hopping-aware CBR, the sidelink UE may set the denominator of the frequency hopping-aware CBR to 5. In some instances, the sidelink UE may utilize one or more components, such as the processor 402, the sidelink communication module 408, the transceiver 410, the modem 412, and the one or more antennas 416, to count the number of subchannels in the frequency hopping pattern with an RSSI above the preconfigured threshold over a time interval and compute the CBR based on the count and a total number of frequency subbands in the frequency hopping pattern.

A CR is a metric indicating a number of subchannels (e.g., the frequency subbands 302) occupied by a sidelink UE for transmission divided by a total number of subbchannels in the resource pool. The CR metric can be computed for a certain number of time intervals or subframes (e.g., the time periods 702, 802, 902, and/or 1002). The CR can provide an indication of channel utilization by the sidelink UE. In some instances, a sidelink UE may compute a CR by counting a number of subchannels in the resource pool where the sidelink UE has an active transmission (e.g., a subchannel count) over a time interval and dividing the subchannel count by the total number of subchannels in the resource pool. In some instances, the sidelink UE may be configured, for example, by a serving BS, to report a CR to the BS.

In some aspects, when a sidelink system utilizes LBT as shown in the schemes 300, 600, 700, 800, and 900, a sidelink UE (e.g., the UEs 115, 215, and/or 400) may determine an LBT-aware CR. In this regard, the sidelink UE may consider the number of subchannels or frequency subbands where the sidelink UE passed an LBT when computing the CR. In this regard, the sidelink UE may adjust the CR by configuring the denominator of the CR based on a total number of frequency subbands in which the sidelink UE passed an LBT instead of a total number of frequency subbands in the resource pool. In other words, the LBT-aware CR may consider the subchannels that are available to the sidelink UE. For instance, a sidelink resource pool (e.g., the sidelink resource pool 308 and/or 1040) may have 10 frequency subbands, and the sidelink UE may have pass LBT in 5 frequency subbands. To compute the LBT-aware CR, the sidelink UE may set the denominator of the LBT-aware CR to 5. The LBT-aware CR may provide an indication of intra-system or intra-operator or intra-technology blocking (e.g., blocked by another sidelink UE within the same sidelink system). In some instances, the sidelink UE may utilize one or more components, such as the processor 402, the sidelink communication module 408, the transceiver 410, the modem 412, and the one or more antennas 416, to determine the number of subbands that are available to the sidelink UE (e.g., passing LBT) and a number of available subbands that are occupied by the sidelink UE and compute the CR based on the count and the total number of available frequency subbands.

In some aspects, when a sidelink system utilizes LBT as shown in the schemes 300, 600, 700, 800, and 900 and frequency hopping as shown in the scheme 1000, a sidelink UE (e.g., the UEs 115, 215, and/or 400) may determine a frequency hopping-aware, LBT-aware CR. In this regard, the sidelink UE may consider the number of subchannels or frequency subbands where the sidelink UE passed an LBT and the number of subchannels in a frequency hopping pattern used by the UE when computing the CR. In this regard, the sidelink UE may adjust the CR by configuring the denominator of the CR based on a total number of frequency subbands in the frequency pattern in which the sidelink UE passed an LBT. In other words, frequency hopping-aware, LBT-aware CR may consider the subchannels that are in the frequency hopping pattern and are available to the sidelink UE. For instance, a sidelink resource pool (e.g., the sidelink resource pool 308 and/or 1040) may have 10 frequency subbands, and the sidelink UE may be configured with a frequency hopping pattern including 8 frequency subbands and may have pass LBT in 5 frequency subbands. To compute the frequency hopping-aware, LBT-aware CR, the sidelink UE may set the denominator of the LBT-aware CR to 5. The frequency hopping-aware, LBT-aware CR may provide an indication of intra-system blocking (e.g., blocked by another sidelink UE within the same sidelink system) within the frequency subbands of the frequency hopping pattern. In some instances, the sidelink UE may utilize one or more components, such as the processor 402, the sidelink communication module 408, the transceiver 410, the modem 412, and the one or more antennas 416, to determine the number of subbands in the frequency hopping pattern that are available to the sidelink UE (e.g., passing LBT) and a number of available subbands that are occupied by the sidelink UE and compute the CR based on the count and the total number of available frequency subbands in the frequency hopping pattern.

In some aspects, a sidelink UE (e.g., the UEs 115, 215, and/or 400) may report a frequency hopping-aware CBR, an LBT-aware CR, and/or a frequency hopping-aware, LBT-aware CR to a serving BS (e.g., the BSs 105, 205, and/or 500). The serving BS may control intra-sidelink collision, for example, by adjusting the resource pool configuration (e.g., number of frequency subbands and/or durations of the sidelink communication frame structure 304) and/or configuring one or more sidelink UEs with a modified frequency hopping pattern.

Figure 11:
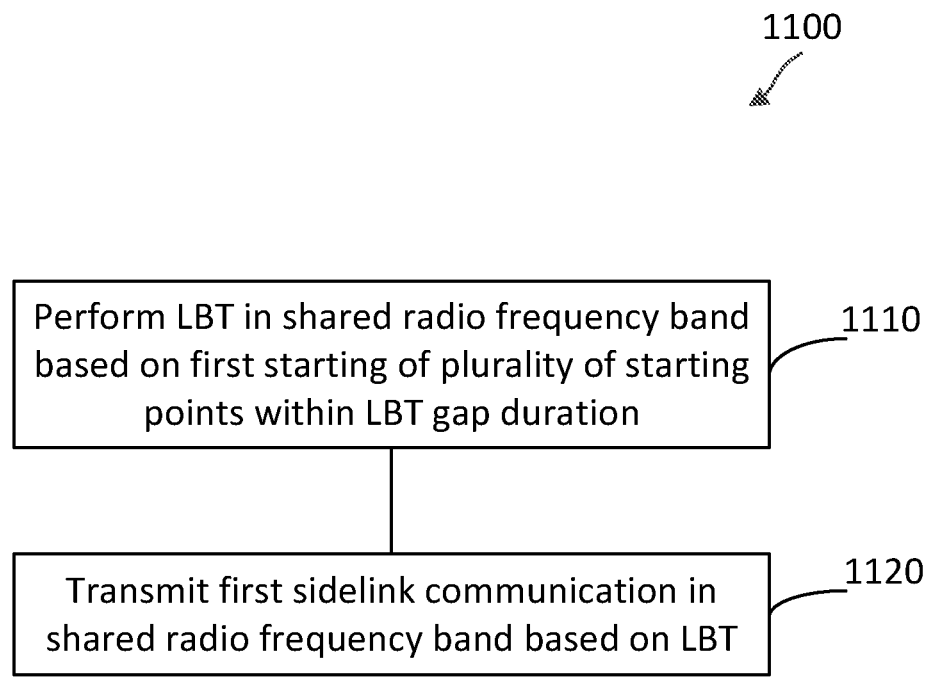
FIG. 11 is a flow diagram of a sidelink communication method according to some aspects of the present disclosure.

FIG. 11 is a flow diagram of a sidelink communication method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the UEs 115, 215, and/or 400, may utilize one or more components, such as the processor 402, the memory 404, the sidelink communication module 408, the transceiver 410, the modem 412, and the one or more antennas 416, to execute the steps of method 1100. The method 1100 may employ similar mechanisms as in the schemes 300, 600, 700, 800, 900, and/or 1000 discussed above with respect to FIGS. 3, 6, 7, 8, 9, and/or 10, respectively. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, a first UE performs an LBT in a shared radio frequency band (e.g., the frequency band 301) based on a first starting point of a plurality of starting points (e.g., the LBT starting points 610) within an LBT gap duration (e.g., the LBT gap duration 310). In some instances, the first UE may utilize one or more components, such as the processor 402, the sidelink communication module 408, the transceiver 410, the modem 412, and the one or more antennas 416, to perform the LBT by measuring signal energy in the shared radio frequency band beginning at the first starting point and over a duration of a CCA slot (e.g., ending at a next starting point), comparing the channel signal measurement to a threshold, determining that the LBT is a pass (e.g., the channel is available) when the channel signal measurement is below the threshold, and determining that the LBT fails (e.g., channel is busy) when the channel signal measurement is above the threshold.

At block 1120, the first UE transmits, to a second UE, a first sidelink communication in the shared radio frequency band based on the LBT. The first sidelink communication includes first SCI (e.g., SCI 710, 810, 812, 910, 1010, 1012, 1014, and/or 1016) and first sidelink data. In some instances, the first UE may utilize one or more components, such as the processor 402, the sidelink communication module 408, the transceiver 410, the modem 412, and the one or more antennas 416, to transmit the first sidelink communication in the shared radio frequency band when the LBT performed at the block 1110 is a pass.

In some aspects, the first UE may select the first starting point from the plurality of starting points based on a priority of the first sidelink data for performing the LBT at block 1110. In some instances, the first UE may utilize one or more components, such as the processor 402, the sidelink communication module 408, the transceiver 410, the modem 412, and the one or more antennas 416, to select an earlier starting point from the plurality of starting points when the first sidelink data has a high priority or select a later starting point from the plurality of starting points when the first sidelink data has a low priority. In some aspects, the first UE may select multiple starting points from the plurality of starting points based on a priority of the first sidelink data for performing the LBT at block 1110 as discussed above in the scheme 800 and/or 900 with reference to FIGS. 8 and/or 9, respectively.

In some aspects, the first UE may further transmit second SCI indicating a reservation for the first starting point used for performing the LBT at block 1110. In some instances, the first UE may utilize one or more components, such as the processor 402, the sidelink communication module 408, the transceiver 410, the modem 412, and the one or more antennas 416, to transmit the second SCI.

In some aspects, the first UE may further receive second SCI indicating a reservation for a second starting point of the plurality of starting points and select the first starting point used for performing the LBT at block 1110 based on the second starting point. In some instances, the first UE may utilize one or more components, such as the processor 402, the sidelink communication module 408, the transceiver 410, the modem 412, and the one or more antennas 416, to select the first starting point to be earlier than the second starting point when the first sidelink data has a higher priority than the reservation or select the first starting point to be later than the second starting point when the first sidelink data has a lower priority than the reservation.

Further aspects of the present disclosure include a non-transitory computer-readable medium having program code recorded thereon. The non-transitory computer-readable medium includes code for causing a first user equipment (UE) to perform a listen-before-talk (LBT) in a shared radio frequency band based on a first starting point of a plurality of starting points within an LBT gap duration. The non-transitory computer-readable medium also includes code for causing the first UE to transmit, to a second UE, a first sidelink communication in the shared radio frequency band based on the LBT, the first sidelink communication including first sidelink control information (SCI) and first sidelink data.

The non-transitory computer-readable medium may also include one or more of the following features. For instance, the non-transitory computer-readable medium may include code for causing the first UE to select the first starting point from the plurality of starting points based on a priority of the first sidelink data. The non-transitory computer-readable medium may include code for causing the first UE to transmit second SCI indicating a reservation for the first starting point for performing the LBT. The reservation indicates multiple starting points of the plurality of starting points reserved for the LBT, the multiple starting points including the first starting point. A number of starting points in the multiple starting points is based on a priority of the first sidelink data. The code for causing the first UE to perform the LBT is configured to perform the LBT in response to a failure of another LBT. The reservation indicates that the first starting point is associated with a first frequency subband in the shared radio frequency band and a second starting point of the multiple starting points is associated with a second frequency subband in the shared radio frequency band, the second frequency subband being different from the first frequency subband; and the code for causing the first UE to perform the LBT is configured to perform a first LBT in the first frequency subband based on the first starting point. The code for causing the first UE to perform the LBT is configured to perform a second LBT in the second frequency subband based on the second starting point. The code for causing the first UE to perform the LBT is configured to perform the first LBT in response to a failure of the second LBT. The code for causing the first UE to perform the LBT is configured to perform the LBT based on the first starting point being different from the second starting point indicated by the first reservation. The first starting point is after the second starting point based on at least one of a priority of the first sidelink data or a priority of the first reservation. The first starting point is before the second starting point based on at least one of a priority of the first sidelink data or a priority of the first reservation. The non-transitory computer-readable medium may include code for causing the first UE to transmit third SCI indicating a second reservation for the first starting point based on the first sidelink data having a higher priority than second sidelink data associated with the first reservation. The code for causing the first UE to transmit the first sidelink communication is configured to transmit, to the second UE, the first SCI based on a common SCI start boundary among a plurality of sidelink UEs including the non-transitory computer-readable medium and the second UE; and transmit a filler signal before the first SCI. The code for causing the first UE to transmit the first sidelink communication is configured to transmit, to the second UE, the first SCI starting at a time when the LBT passes. The code for causing the first UE to perform the LBT is configured to perform an LBT in one or more frequency subbands within the shared radio frequency band; and the program code further includes code for causing the first UE to transmit a channel access occupancy ratio (CR) report based on a number of frequency subbands of the one or more frequency subbands having an LBT pass. The code for causing the first UE to perform the LBT is configured to perform the LBT in a first frequency subband of a plurality of frequency subbands in the shared radio frequency band further based on a frequency hopping pattern; and the code for causing the first UE to transmit the first sidelink communication is configured to transmit the first SCI in the first frequency subband, the first SCI indicating a reservation for a second frequency subband of the plurality of frequency subbands based on the frequency hopping pattern. The non-transitory computer-readable medium may include code for causing the first UE to transmit, to the second UE, the first sidelink data in the first frequency subband during a first time period; and code for causing the first UE to transmit, to the second UE, second sidelink data in the second frequency subband during a second time period after the first time period based on the reservation. The non-transitory computer-readable medium may include code for causing the first UE to transmit a channel busy ratio (CBR) report based on a number of frequency subbands associated with the frequency hopping pattern in the plurality of frequency subbands. The non-transitory computer-readable medium may include code for causing the first UE to perform an LBT in each frequency subband associated with the frequency hopping pattern; and code for causing the first UE to transmit a channel access occupancy ratio (CR) report based on a number of frequency subbands associated with the frequency hopping pattern having an LBT pass.

Further aspect of the present disclosure include an apparatus including means for performing a listen-before-talk (LBT) in a shared radio frequency band based on a first starting point of a plurality of starting points within an LBT gap duration. The apparatus also includes means for transmitting, to a second UE, a first sidelink communication in the shared radio frequency band based on the LBT, the first sidelink communication including first sidelink control information (SCI) and first sidelink data.

The apparatus may also include one or more of the following features. For instance, the apparatus may include means for selecting the first starting point from the plurality of starting points based on a priority of the first sidelink data. The apparatus may include means for transmitting second SCI indicating a reservation for the first starting point for performing the LBT. The reservation indicates multiple starting points of the plurality of starting points reserved for the LBT, the multiple starting points including the first starting point. A number of starting points in the multiple starting points is based on a priority of the first sidelink data. The means for performing the LBT is configured to perform the LBT in response to a failure of another LBT. The reservation indicates that the first starting point is associated with a first frequency subband in the shared radio frequency band and a second starting point of the multiple starting points is associated with a second frequency subband in the shared radio frequency band, the second frequency subband being different from the first frequency subband; and the means for performing the LBT is configured to perform a first LBT in the first frequency subband based on the first starting point. The means for performing the LBT is configured to perform a second LBT in the second frequency subband based on the second starting point. The means for performing the LBT is configured to perform the first LBT in response to a failure of the second LBT. The means for performing the LBT is configured to perform the LBT based on the first starting point being different from the second starting point indicated by the first reservation. The first starting point is after the second starting point based on at least one of a priority of the first sidelink data or a priority of the first reservation. The first starting point is before the second starting point based on at least one of a priority of the first sidelink data or a priority of the first reservation. The apparatus may include means for transmitting third SCI indicating a second reservation for the first starting point based on the first sidelink data having a higher priority than second sidelink data associated with the first reservation. The means for transmitting the first sidelink communication is configured to transmit, to the second UE, the first SCI based on a common SCI start boundary among a plurality of sidelink UEs including the apparatus and the second UE; and transmit a filler signal before the first SCI. The means for transmitting the first sidelink communication is configured to transmit, to the second UE, the first SCI starting at a time when the LBT passes. The means for performing the LBT is configured to perform an LBT in one or more frequency subbands within the shared radio frequency band; and the apparatus further includes means for transmitting a channel access occupancy ratio (CR) report based on a number of frequency subbands of the one or more frequency subbands having an LBT pass. The means for performing the LBT is configured to perform the LBT in a first frequency subband of a plurality of frequency subbands in the shared radio frequency band further based on a frequency hopping pattern; and the means for transmitting the first sidelink communication is configured to transmit the first SCI in the first frequency subband, the first SCI indicating a reservation for a second frequency subband of the plurality of frequency subbands based on the frequency hopping pattern. The apparatus may include means for transmitting, to the second UE, the first sidelink data in the first frequency subband during a first time period; and means for transmitting, to the second UE, second sidelink data in the second frequency subband during a second time period after the first time period based on the reservation. The apparatus may include means for transmitting a channel busy ratio (CBR) report based on a number of frequency subbands associated with the frequency hopping pattern in the plurality of frequency subbands. The apparatus may include means for performing an LBT in each frequency subband associated with the frequency hopping pattern; and means for transmitting a channel access occupancy ratio (CR) report based on a number of frequency subbands associated with the frequency hopping pattern having an LBT pass.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspect illustrated and described herein, as they are merely by way of some examples thereof, but rather, should be fully commensurate with that of the claims appended hereafter and their functional equivalents.

What is claimed is:

1. A method of wireless communication, comprising:
performing, by a first user equipment (UE), a listen-before-talk (LBT) in a shared radio frequency band based on a first starting point of a plurality of starting points within a first LBT gap duration; and
transmitting, by the first UE to a second UE, a first sidelink communication in the shared radio frequency band based on the LBT, the first sidelink communication including first sidelink control information (SCI) and first sidelink data;
wherein the first SCI indicates a reservation for a first starting point of a plurality of starting points for performing a LBT in the shared radio frequency band within a second LBT gap duration.

2. The method of claim 1, further comprising:
selecting, by the first UE, the first starting point from the plurality of starting points within the second LBT gap duration based on a priority of the first sidelink data.

3. The method of claim 1, wherein the reservation indicates multiple starting points of the plurality of starting points reserved for the LBT within the second LBT gap duration, the multiple starting points including the first starting point within the second LBT gap duration.

4. The method of claim 3, further comprising:
transmitting, by the first UE to the second UE, a second sidelink communication in the shared radio frequency band based on the LBT performed in the second LBT gap duration, the second sidelink communication including a second SCI and second sidelink data; and
wherein a number of starting points in the multiple starting points is based on a priority of second sidelink data.

5. The method of claim 3, further comprising:
performing, by the first UE, a second LBT based on a second starting point of the multiple starting points within the second LBT gap duration,
wherein the performing the second LBT is in response to a failure of the first LBT within the second LBT gap duration.

6. The method of claim 3, wherein:
the reservation indicates that the first starting point is associated with a first frequency subband in the shared radio frequency band and a second starting point of the multiple starting points is associated with a second frequency subband in the shared radio frequency band, the second frequency subband being different from the first frequency subband; and further comprising:
performing in the first frequency subband, by the first UE, a first LBT in the second LBT gap duration based on the first starting point.

7. The method of claim 6, further comprising:
performing, by the first UE, a second LBT in the second frequency subband based on the second starting point.

8. The method of claim 7, wherein the performing the second LBT in the second LBT gap duration is in response to a failure of the first LBT in the second LBT gap duration.

9. The method of claim 1, wherein the transmitting the first sidelink communication comprises:
transmitting, by the first UE to the second UE, the first SCI based on a common SCI start boundary among a plurality of sidelink UEs including the first UE and the second UE; and
transmitting, by the first UE, a filler signal before the first SCI.

10. The method of claim 1, wherein the transmitting the first sidelink communication comprises:
transmitting, by the first UE to the second UE, the first SCI starting at a time when the LBT passes.

11. The method of claim 1, wherein:
the performing the LBT comprises:
performing, by the first UE, an LBT in one or more frequency subbands within the shared radio frequency band; and
the method further comprises:
transmitting, by the first UE, a channel access occupancy ratio (CR) report based on a number of frequency subbands of the one or more frequency subbands having an LBT pass.

12. A method of wireless communication, comprising:
performing, by a first user equipment (UE), a listen-before-talk (LBT) in a shared radio frequency band based on a first starting point of a plurality of starting points within a LBT gap duration; and
transmitting, by the first UE to a second UE, a first sidelink communication in the shared radio frequency band based on the LBT, the first sidelink communication including first sidelink control information (SCI) and first sidelink data receiving, by the first UE, second SCI indicating a first reservation for a second starting point of the plurality of staring points,
wherein the performing the LBT is based on the first starting point being different from the second starting point indicated by the first reservation.

13. The method of claim 12, wherein the first starting point is after the second starting point based on at least one of a priority of the first sidelink data or a priority of the first reservation.

14. The method of claim 12, wherein the first starting point is before the second starting point based on at least one of a priority of the first sidelink data or a priority of the first reservation.

15. The method of claim 14, further comprising:
transmitting, by the first UE after passing a LBT, third SCI indicating a second reservation for the first starting point based on the first sidelink data having a higher priority than second sidelink data associated with the first reservation.

16. A method of wireless communication, comprising:
performing, by a first user equipment (UE), a listen-before-talk (LBT) in a shared radio frequency band based on a first starting point of a plurality of starting points within a first LBT gap duration; and
transmitting, by the first UE to a second UE, a first sidelink communication in the shared radio frequency band based on the LBT, the first sidelink communication including first sidelink control information (SCI) and first sidelink data;
wherein the performing the LBT comprises:
performing, by the first UE, the LBT in a first frequency subband of a plurality of frequency subbands in the shared radio frequency band further based on a frequency hopping pattern; and
the transmitting the first sidelink communication comprises:
transmitting, by the first UE, the first SCI in the first frequency subband, the first SCI indicating a reservation for a second frequency subband of the plurality of frequency subbands based on the frequency hopping pattern.

17. The method of claim 16, further comprising:
transmitting, by the first UE to the second UE, the first sidelink data in the first frequency subband during a first time period; and
transmitting, by the first UE to the second UE, second sidelink data in the second frequency subband during a second time period after the first time period based on the reservation.

18. The method of claim 16, further comprising:
transmitting, by the first UE, a channel busy ratio (CBR) report based on a number of frequency subbands associated with the frequency hopping pattern in the plurality of frequency subbands.

19. The method of claim 16, further comprising:
performing, by the first UE, an LBT in each frequency subband associated with the frequency hopping pattern; and
transmitting, by the first UE, a channel access occupancy ratio (CR) report based on a number of frequency subbands associated with the frequency hopping pattern having an LBT pass.

20. An apparatus comprising:
a processor configured to perform a listen-before-talk (LBT) in a shared radio frequency band based on a first starting point of a plurality of starting points within a first LBT gap duration; and a transceiver in communication with the processor, the processor configured to transmit, to a second user equipment (UE), a first sidelink communication in the shared radio frequency band based on the LBT, the first sidelink communication including first sidelink control information (SCI) and first sidelink data; wherein the first SCI indicates a reservation for a first starting point of a plurality of starting points for performing a LBT in the shared radio frequency band within a second LBT gap duration.

21. The apparatus of claim 20, wherein the processor is further configured to:
select the first starting point from the plurality of starting points within the second LBT gap duration based on a priority of the first sidelink data.

22. The apparatus of claim 20, wherein the reservation indicates multiple starting points of the plurality of starting points reserved for the LBT within the second LBT gap duration, the multiple starting points including the first starting point within the second LBT gap duration.

23. The apparatus of claim 22, wherein the processor is further configured to:
transmit to the second UE, a second sidelink communication in the shared radio frequency band based on the LBT performed in the second LBT gap duration, the second sidelink communication including a second SCI and second sidelink data; and
wherein a number of starting points in the multiple starting points is based on a priority of the second sidelink data.

24. The apparatus of claim 22, wherein:
the processor is further configured to:
perform a second LBT based on a second starting point of the multiple starting points within the second LBT gap duration; and
the processor configured to perform the second LBT is configured to:
perform the second LBT in response to a failure of the first LBT within the second LBT gap duration.

25. The apparatus of claim 22, wherein:
the reservation indicates that the first starting point is associated with a first frequency subband in the shared radio frequency band and a second starting point of the multiple starting points is associated with a second frequency subband in the shared radio frequency band, the second frequency subband being different from the first frequency subband; and
wherein the processor is further configured to:
perform a first LBT in the first frequency subband based on the first starting point within the second LBT gap.

26. The apparatus of claim 25, wherein the processor is further configured to:
perform a second LBT in the second frequency subband based on the second starting point.

27. The apparatus of claim 26, wherein the processor configured to perform the second LBT within the second LBT gap duration is configured to:
perform the second LBT within the second LBT gap duration in response to a failure of the first LBT in the second LBT gap duration.

28. The apparatus of claim 20, wherein the transceiver configured to transmit the first sidelink communication is configured to:

transmit, to the second UE, the first SCI based on a common SCI start boundary among a plurality of sidelink UEs including the apparatus and the second UE; and transmit a filler signal before the first SCI.

29. The apparatus of claim 20, wherein the transceiver configured to transmit the first sidelink communication is configured to:
transmit, to the second UE, the first SCI starting at a time when the LBT passes.

30. The apparatus of claim 20, wherein:
the processor configured to perform the LBT is configured to:
perform an LBT in one or more frequency subbands within the shared radio frequency band; and
the transceiver is further configured to:
transmit a channel access occupancy ratio (CR) report based on a number of frequency subbands of the one or more frequency subbands having an LBT pass.

31. An apparatus comprising
a processor configured to perform a listen-before-talk (LBT) in a shared radio frequency band based on a first starting point of a plurality of starting points within a first LBT gap duration; and
a transceiver in communication with the processor, the processor configured to transmit, to a second user equipment (UE), a first sidelink communication in the shared radio frequency band based on the LBT, the first sidelink communication including first sidelink control information (SCI) and first sidelink data; the transceiver is further configured to:
receive second SCI indicating a first reservation for a second starting point of the plurality of staring points; and
the processor configured to perform the LBT is configured to:
perform the LBT based on the first starting point being different from the second starting point indicated by the first reservation.

32. The apparatus of claim 31, wherein the first starting point is after the second starting point based on at least one of a priority of the first sidelink data or a priority of the first reservation.

33. The apparatus of claim 31, wherein the first starting point is before the second starting point based on at least one of a priority of the first sidelink data or a priority of the first reservation.

34. The apparatus of claim 33, wherein the transceiver is further configured to:
transmit third SCI after passing an LBT indicating a second reservation for the first starting point based on the first sidelink data having a higher priority than second sidelink data associated with the first reservation.

35. An apparatus comprising:
a processor configured to perform a listen-before-talk (LBT) in a shared radio frequency band based on a first starting point of a plurality of starting points within a first LBT gap duration; and
a transceiver in communication with the processor, the processor configured to transmit, to a second user equipment (UE), a first sidelink communication in the shared radio frequency band based on the LBT, the first sidelink communication including first sidelink control information (SCI) and first sidelink data;

wherein the processor configured to perform the LBT is configured to:
perform the LBT in a first frequency subband of a plurality of frequency subbands in the shared radio frequency band further based on a frequency hopping pattern; and the transceiver configured to transmit the first sidelink communication is configured to:
transmit the first SCI in the first frequency subband, the first SCI indicating a reservation for a second frequency subband of the plurality of frequency subbands based on the frequency hopping pattern.

36. The apparatus of claim 35, wherein the transceiver is further configured to:
transmit, to the second UE, the first sidelink data in the first frequency subband during a first time period; and
transmit, to the second UE, second sidelink data in the second frequency subband during a second time period after the first time period based on the reservation.

37. The apparatus of claim 35, wherein the transceiver is further configured to:
transmit a channel busy ratio (CBR) report based on a number of frequency subbands associated with the frequency hopping pattern in the plurality of frequency subbands.

38. The apparatus of claim 35, wherein the processor is further configured to:
perform an LBT in each frequency subband associated with the frequency hopping pattern; and
transmit a channel access occupancy ratio (CR) report based on a number of frequency subbands associated with the frequency hopping pattern having an LBT pass.

39. A non-transitory computer-readable medium having program code recorded thereon, the program code comprising:
code for causing a first user equipment (UE) to perform a listen-before-talk (LBT) in a shared radio frequency band based on a first starting point of a plurality of starting points within an LBT gap duration; and
code for causing the first UE to transmit, to a second UE, a first sidelink communication in the shared radio frequency band based on the LBT, the first sidelink communication including first sidelink control information (SCI) and first sidelink data;
wherein the first SCI indicates a reservation for a first starting point of a plurality of starting points for performing a LBT in the shared radio frequency band within a second LBT gap duration.

40. An apparatus comprising:
means for performing a listen-before-talk (LBT) in a shared radio frequency band based on a first starting point of a plurality of starting points within an LBT gap duration; and
means for transmitting, to a second UE, a first sidelink communication in the shared radio frequency band based on the LBT, the first sidelink communication including first sidelink control information (SCI) and first sidelink data;
wherein the first SCI indicates a reservation for a first starting point of a plurality of starting points for performing a LBT in the shared radio frequency band within a second LBT gap duration.

\* \* \* \* \*